(12) United States Patent
Ono

(10) Patent No.: US 8,535,844 B2
(45) Date of Patent: Sep. 17, 2013

(54) FUEL CELL MODULE

(75) Inventor: Takashi Ono, Kirishima (JP)

(73) Assignee: Kyocera Corporation, Kyoto (JP)

( * ) Notice: Subject to any disclaimer, the term of this patent is extended or adjusted under 35 U.S.C. 154(b) by 895 days.

(21) Appl. No.: 11/996,941

(22) PCT Filed: Jul. 19, 2006

(86) PCT No.: PCT/JP2006/314218
§ 371 (c)(1),
(2), (4) Date: Mar. 3, 2010

(87) PCT Pub. No.: WO2007/013328
PCT Pub. Date: Feb. 1, 2007

(65) Prior Publication Data
US 2010/0167154 A1 Jul. 1, 2010

(30) Foreign Application Priority Data

Jul. 27, 2005 (JP) .................................. 2005-217003
Mar. 30, 2006 (JP) .................................. 2006-094190

(51) Int. Cl.
*H01M 2/38* (2006.01)
*H01M 8/04* (2006.01)

(52) U.S. Cl.
USPC ........... 429/462; 429/120; 429/434; 429/436; 429/454; 429/456; 429/458

(58) Field of Classification Search
USPC ................. 429/434, 436, 120, 454, 456, 458, 429/462
See application file for complete search history.

(56) References Cited

U.S. PATENT DOCUMENTS

| | | | | |
|---|---|---|---|---|
| 5,273,424 A | * | 12/1993 | Kobayashi | 432/241 |
| 2001/0009732 A1 | * | 7/2001 | Schuler | 429/19 |
| 2004/0191593 A1 | * | 9/2004 | Ono et al. | 429/19 |
| 2006/0051642 A1 | * | 3/2006 | Finnerty | 429/30 |
| 2006/0134476 A1 | * | 6/2006 | Tsunoda et al. | 429/20 |

FOREIGN PATENT DOCUMENTS

| | | |
|---|---|---|
| JP | 2003282132 | * 10/2003 |
| JP | 2005-100942 | 4/2005 |
| JP | 2005-123014 | 5/2005 |
| JP | 2005-125526 | 6/2005 |
| JP | 2005-235526 | 9/2005 |

* cited by examiner

Primary Examiner — Milton I Cano
Assistant Examiner — Jeremiah Smith
(74) Attorney, Agent, or Firm — DLA Piper LLP (US)

(57) ABSTRACT

A fuel cell module structure including a heat exchanger capable of preventing leakage of oxygen containing gas in a flow path and reducing the cost. The module including a power-generating chamber that receives fuel cells and a casing having a generally rectangular shape enclosing the power-generating chamber. Additionally, the right and left side walls and an upper wall of the casing are hollow walls constituted of an outer shell member and an inner shell member disposed parallel to each other with a distance therebetween forming a reaction gas circulation space, the outer and inner shell members are each formed in a U-like cross-sectional shape, and a reaction gas introduction member extends vertically downward from the inner shell member of the upper wall into the power-generating chamber and being communicated with the reaction gas circulation space to introduce a reaction gas into the power-generating chamber.

13 Claims, 26 Drawing Sheets

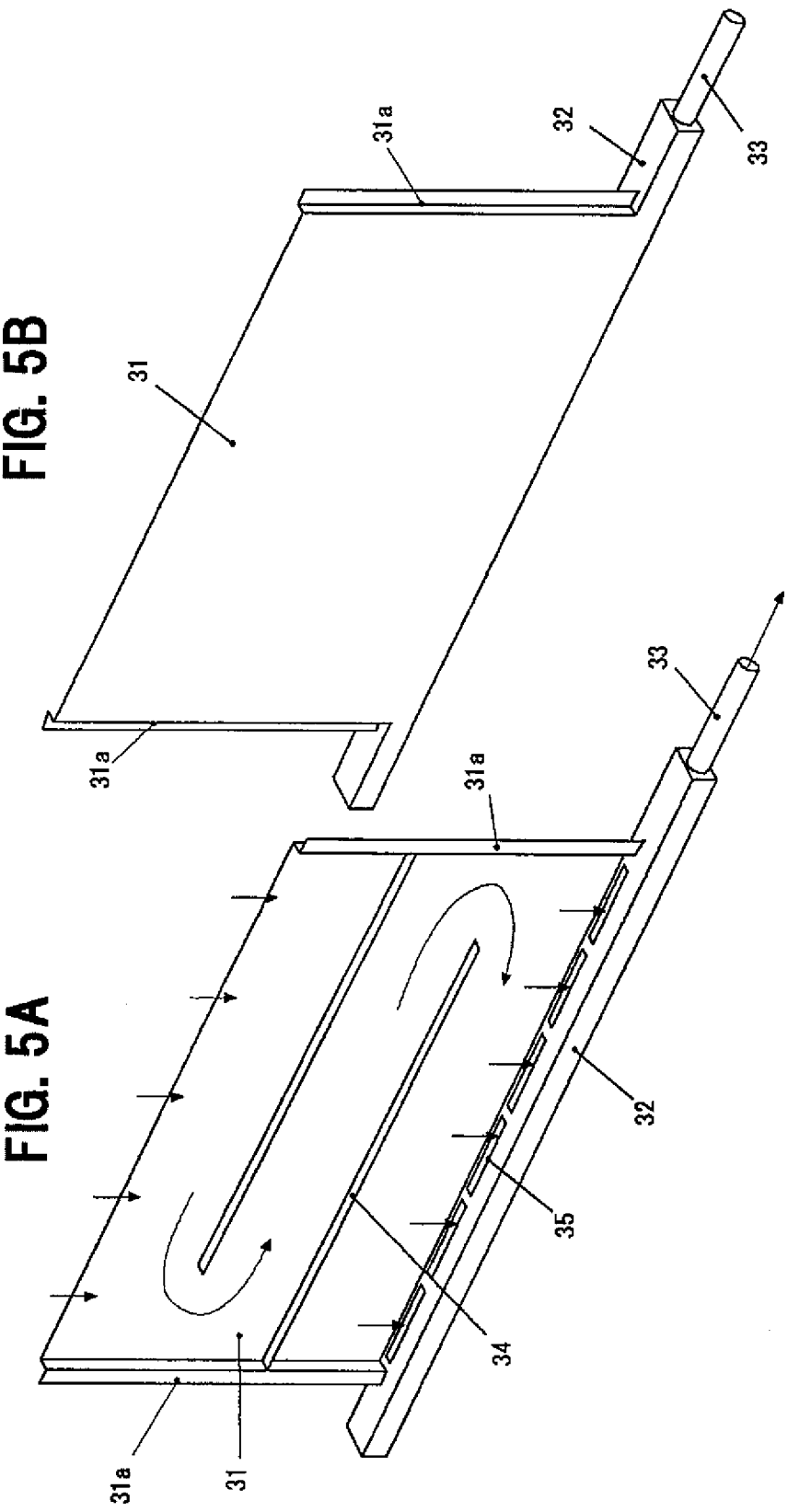

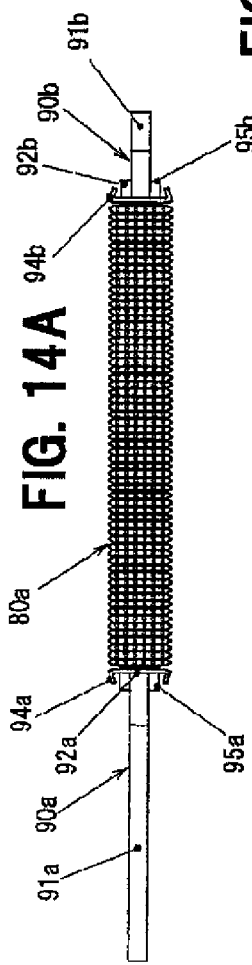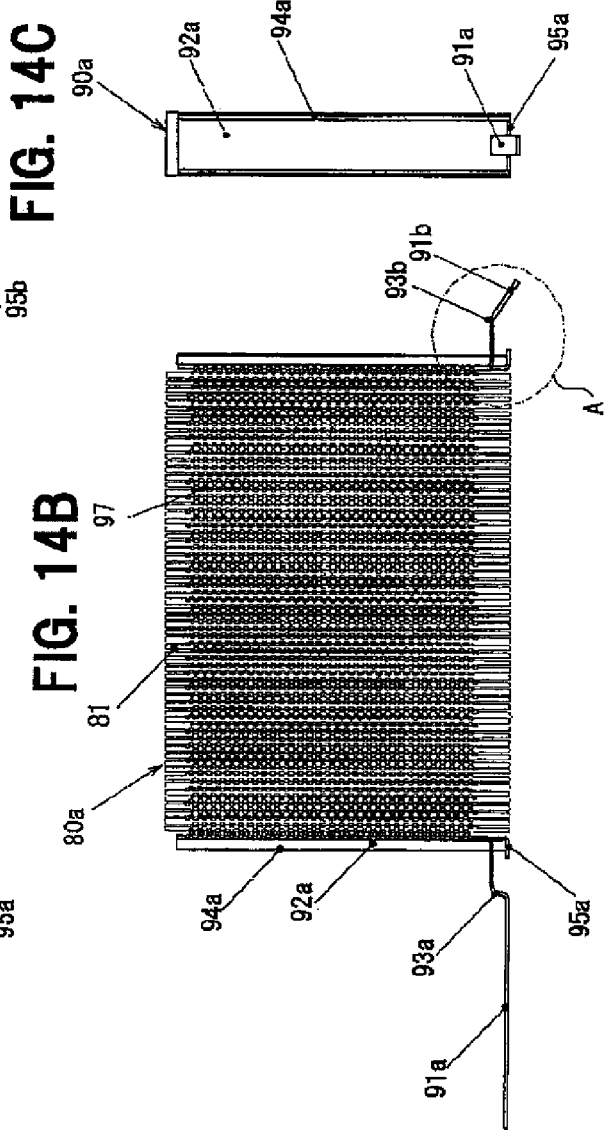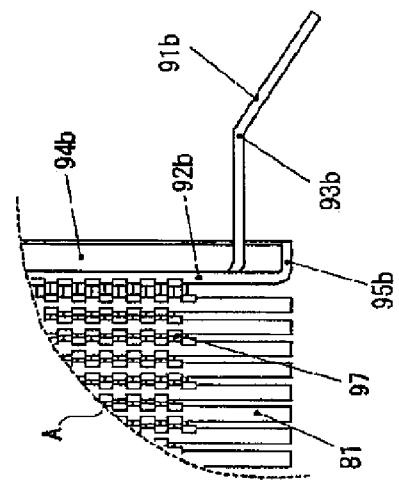
FIG. 14A
FIG. 14B
FIG. 14C
FIG. 14D

81 : FUEL CELL
81a : CONDUCTIVE SUPPORT
81b : FUEL GAS PATH
81c : FUEL ELECTRODE
81d : SOLID ELECTROLYTE
81e : OXYGEN ELECTRODE
81f : INTERCONNECTOR
81g : JUNCTION LAYER
81h : P-TYPE SEMICONDUCTOR LAYER

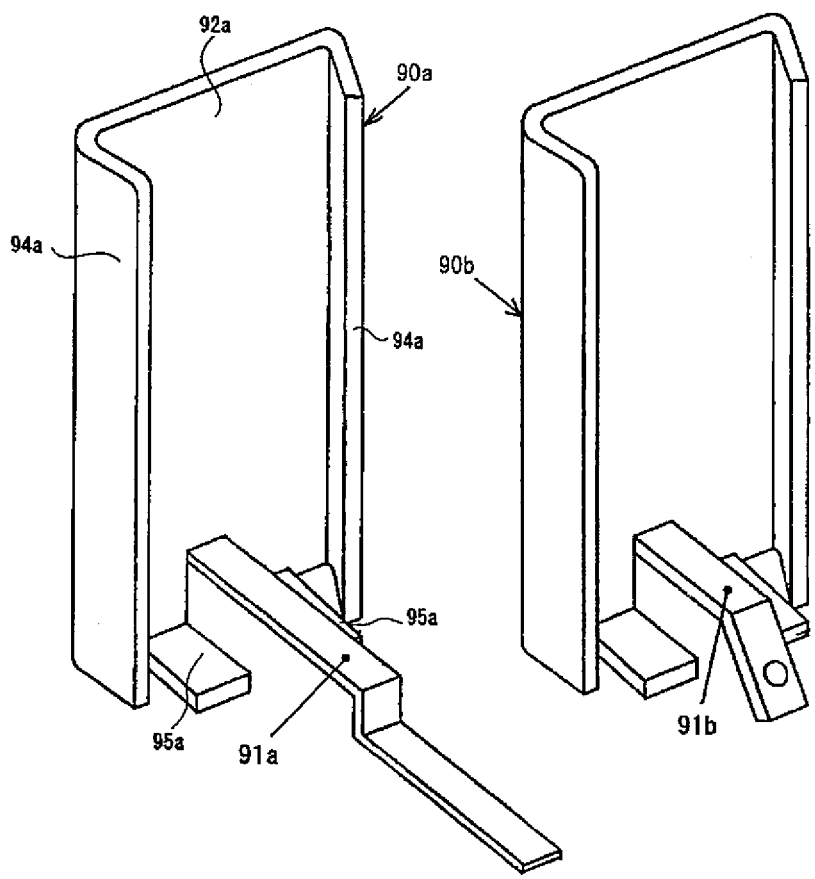

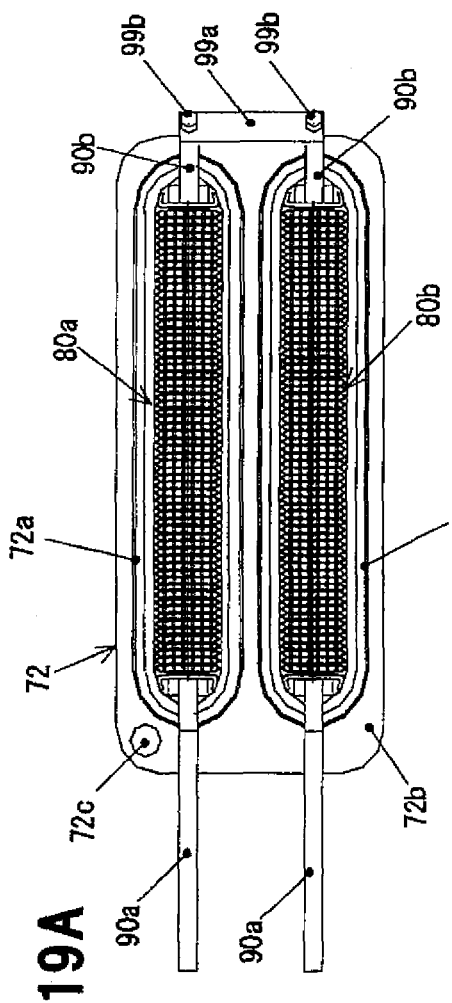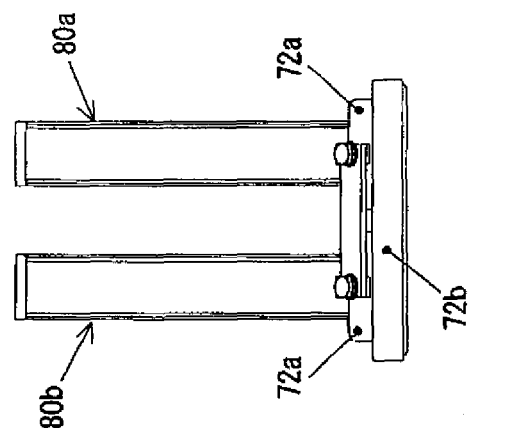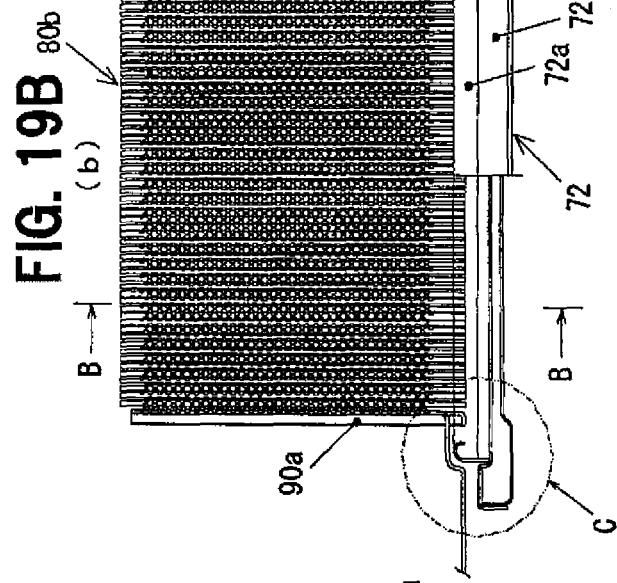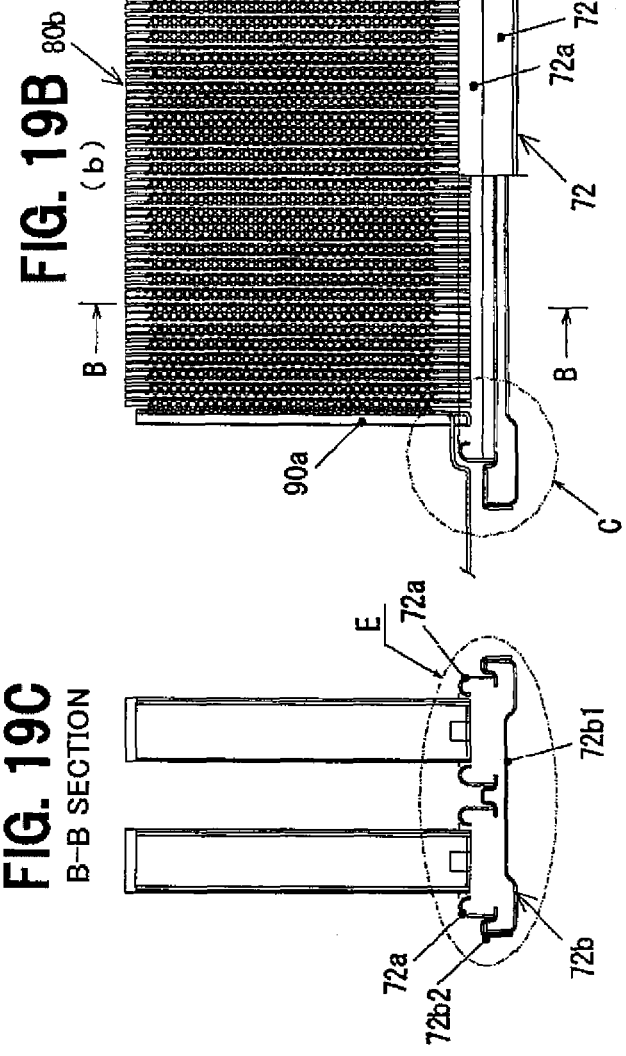
FIG. 19A
FIG. 19B
FIG. 19C B-B SECTION
FIG. 19D

ENLARGED SECTIONAL VIEW OF PORTION C

ENLARGED SECTIONAL VIEW OF PORTION D

ENLARGED SECTIONAL VIEW OF PORTION E

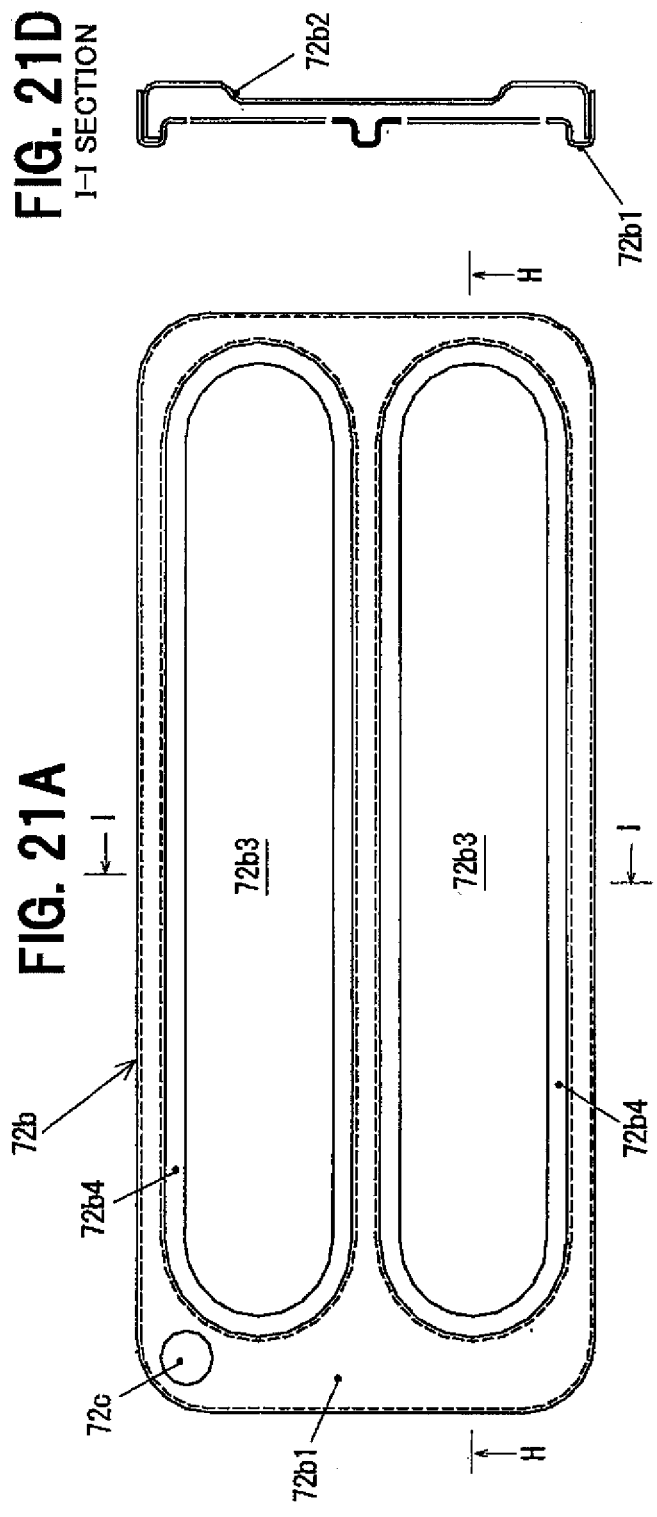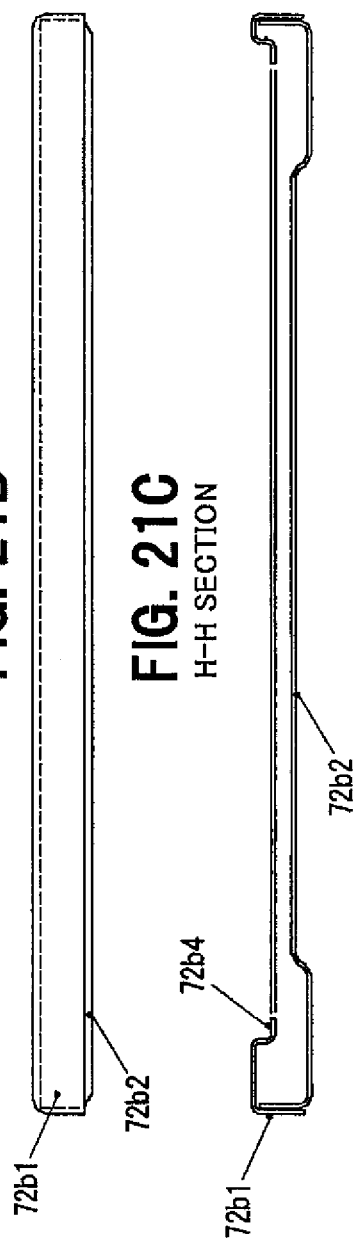

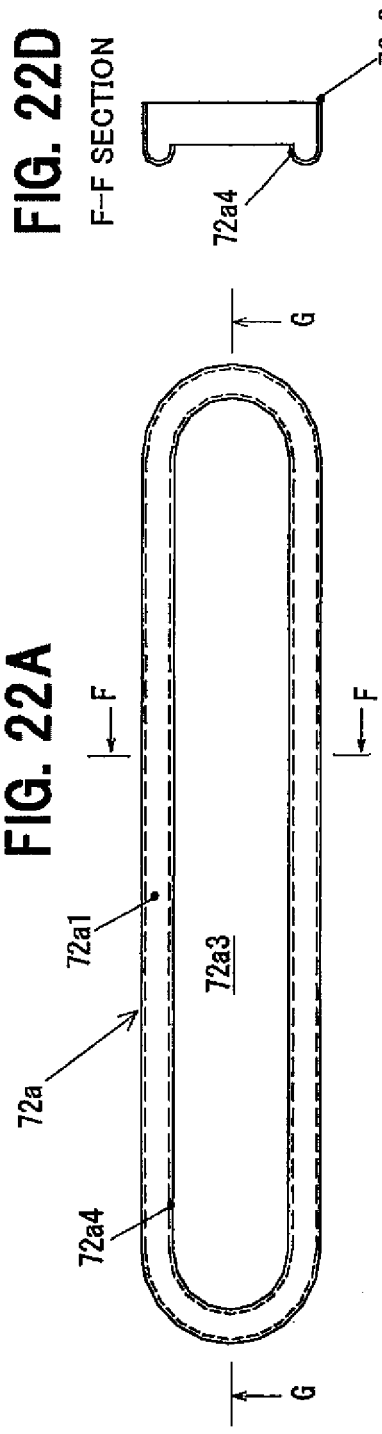
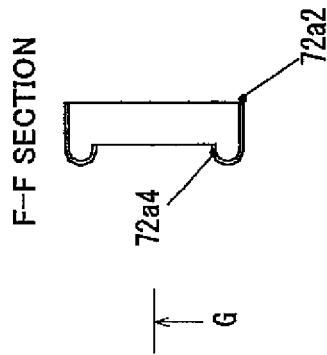
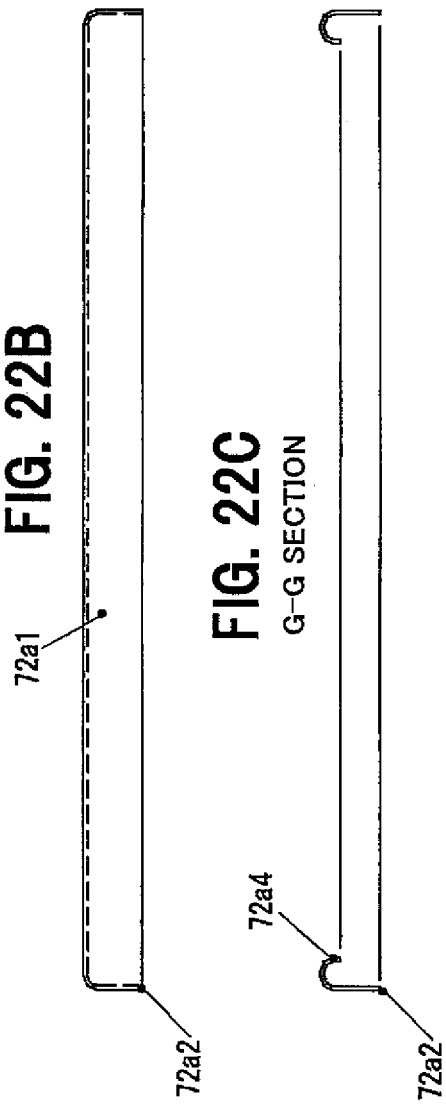
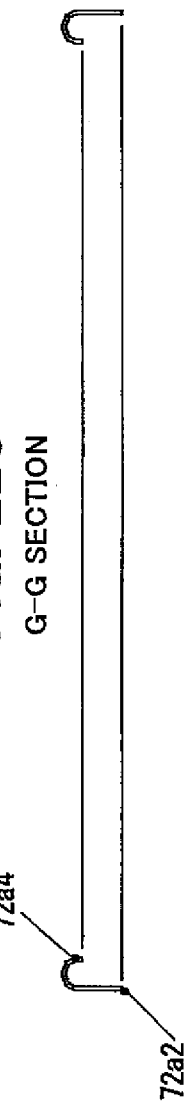

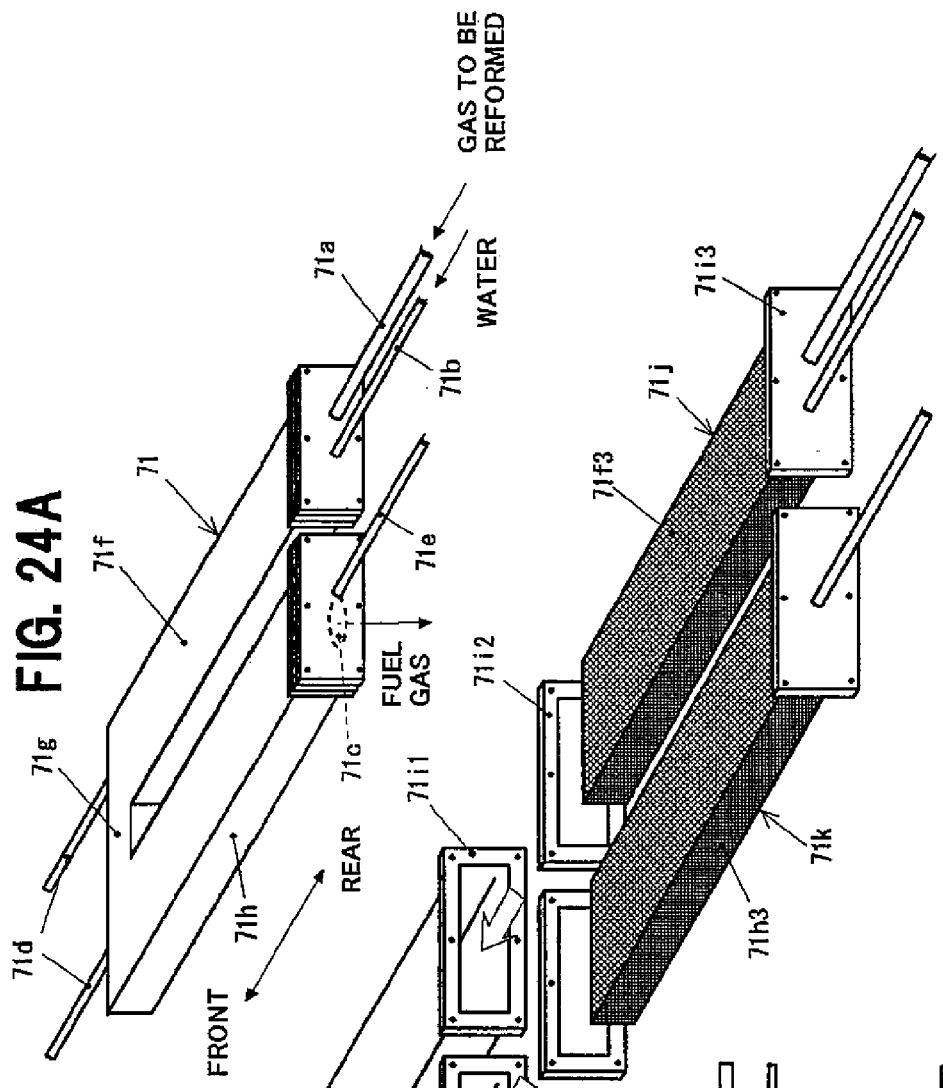
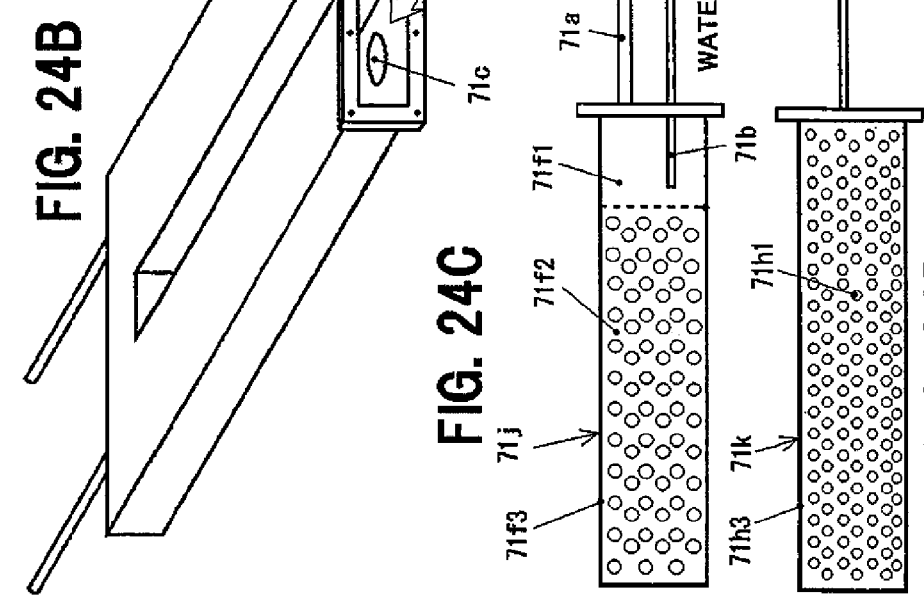

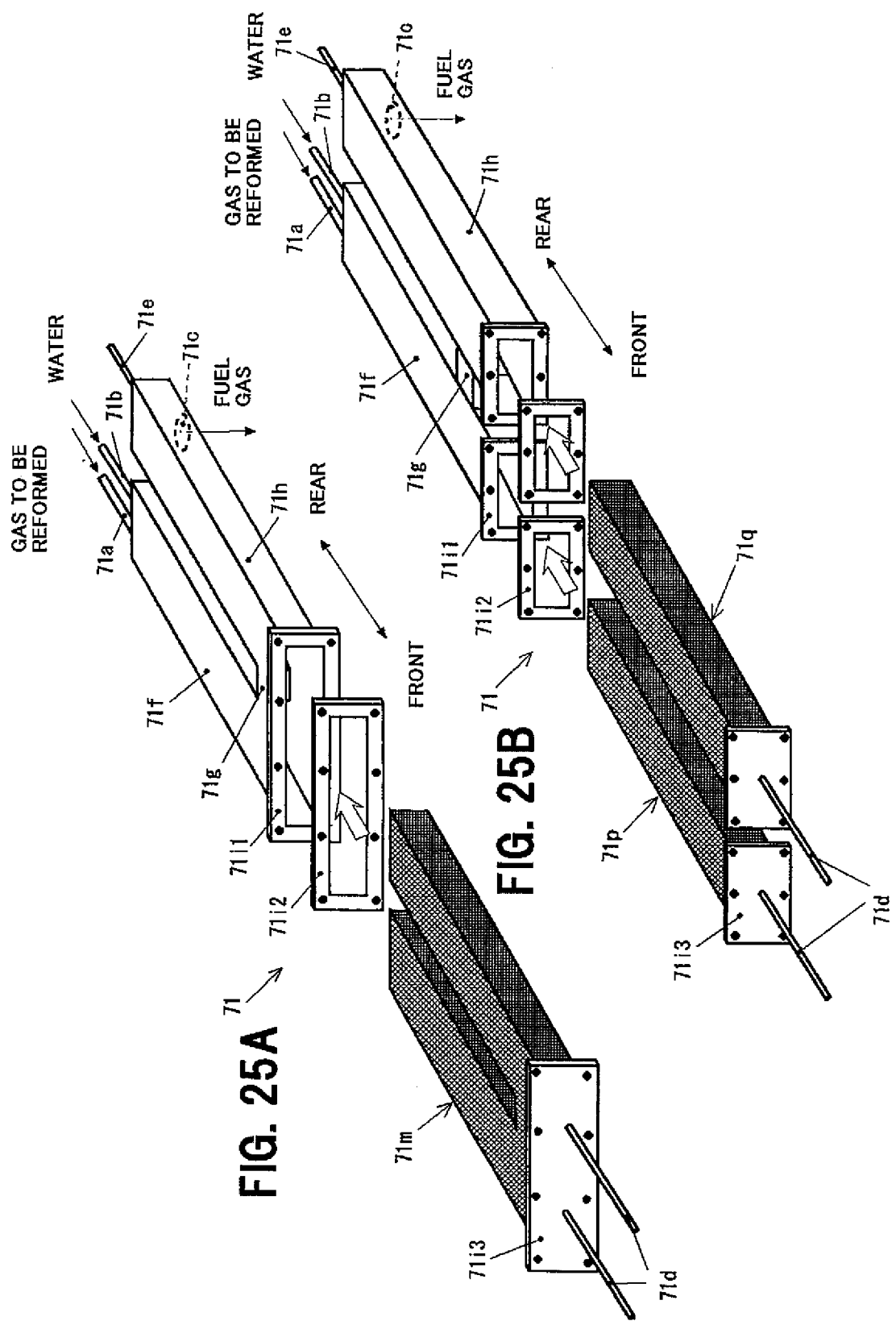

FUEL CELL MODULE

CROSS-REFERENCE TO THE RELATED APPLICATION

This application is a national stage of international application No. PCT/JP2006/314218 filed Jul. 19, 2006, which also claims benefit of priority under 35U.S.C. §119 to Japanese Patent Application No. 2005-217003 filed Jul. 27, 2005 and Japanese Patent Application No. 2006-094190 filed Mar. 30, 2006, the entire contents of which are incorporated herein by reference.

BACKGROUND OF THE INVENTION

1. Field of the Invention

The present invention relates to a fuel cell module having a power-generating chamber containing solid-oxide fuel cells and a casing enclosing the same.

2. Description of the Related Art

FIG. 26 is a schematic sectional view showing a typical example of a conventional solid-oxide fuel cell module 100 (refer to Japanese Unexamined Patent Publication (Kokai)) No. 2005-123014, Japanese Unexamined Patent Publication (Kokai) No. 2005-158526 and the like).

A metal casing 110, which has a generally rectangular shape and encloses a power-generating chamber 111, is provided with heat exchanger 120a and 120b disposed on four or two side faces. The power-generating chamber 111 includes therein, for example, four rows of cell stacks 80 of fuel cells arranged in a line, reformers 71 each disposed thereabove, and manifolds 72 each attached to the respective cell stacks 80. Each of the manifolds 72 is a fuel gas case. Above the power-generating chamber 111, an oxygen-containing gas chamber 140 is disposed. From the oxygen-containing gas chamber 140, a plurality of oxygen-containing gas introduction tubes 141 extends downward vertically into the power-generating chamber 111. Each of the oxygen-containing gas introduction tubes 141 is disposed between the cell stacks. Between the manifold 72 and a lower wall and between the power-generating chamber 111 and the heat exchanger 120a and 120b, heat insulators 61 and 62 are disposed. Although not shown in FIG. 26, outside of the casing 110 also, heat insulators are appropriately disposed, and further, the entirety thereof is received in an appropriate housing, constituting a fuel cell assembly.

A bottom plate 142 of the oxygen-containing gas chamber 140 is placed on the upper face of the exchanger 120a and 120b and the power-generating chamber 111, and fixed thereto. The periphery of the bottom plate 142 protrudes outward of the casing 110 like a flange. In order to seal the gas, the flange portion of the bottom plate 142 is welded to the casing 110. A member constituting the side faces and the upper face of the oxygen-containing gas chamber 140 is placed on the bottom plate 142 and fixed thereto. The plurality of the oxygen-containing gas introduction tubes 141 are attached to the bottom plate 142.

Referring to FIG. 26, an oxygen-containing gas (for example, air) is taken from the outside. The gas enters the oxygen-containing gas flow path (outer flow path) of the heat exchanger 120a and 120b through the lower wall of the casing 110. Passing through the heat exchanger 120a and 120b from the lower portion toward the upper portion thereof, the gas flows into the oxygen-containing gas chamber 140 (indicated with white arrows). On the other hand, a gas to be reformed (for example, hydrocarbon gas such as city gas) is supplied to the reformers 71 through a reform gas supply tube. The reform gas is reformed into a hydrogen-rich fuel gas by a reforming catalyst and fed to the manifolds 72 through pipes (not shown). Utilizing the oxygen-containing gas supplied from the oxygen-containing gas introduction tubes 141 and the fuel gas supplied from the manifolds 72, a power-generating reaction occurs in the cell stacks 80, and thus, the current is output through an output means (not shown). After the power generating reaction, the waste gas enters waste gas flow paths (inner flow path) in the heat exchanger 120a and 120b from an upper portion of the power-generating chamber 111. Passing therethrough from the upper portion toward the lower portion thereof, the waste gas flows out through the lower wall of the casing 110 (indicated with black arrows). Heat is exchanged by the oxygen-containing gas flow path and the waste gas flow path being disposed adjacent to each other in the heat exchanger 120a and 120b, and thereby the oxygen-containing gas is preheated by the heat of the waste gas.

In the above-described fuel cell module 100, the inside of the power-generating chamber 111 has to be maintained at a high temperature of 700 to 1,000° C. when carrying out power generation.

SUMMARY OF THE INVENTION

In the conventional fuel cell module 100 shown in FIG. 26, the upper end of the heat exchanger 120a and 120b and the bottom plate 142 of the oxygen-containing gas chamber 140 are welded and joined to each other at the flange portion. The oxygen-containing gas tends to leak from the welded portion 115. When the high temperature oxygen-containing gas having passed through the heat exchanger leaks, due to heat loss, not only the utilization efficiency of the oxygen-containing gas is reduced, but also the efficiency of heat exchange as well as power generation are reduced and a high efficiency self-sustained heating operation is impaired.

Further, the casing 110 is separated into the upper part and the lower part by the bottom plate 142 of the oxygen-containing gas chamber 140. Therefore, the structure of the fuel cell module 100 is complicated and a large number of component parts are needed. Further, a large number of assembly steps for connecting, fixing and/or welding the component parts are required. As a result, large costs are required for storing the component parts and manufacturing.

As described above, the conventional casing of the fuel cell module has a large number of welding points. Therefore, there are problems such that the gas sealing reliability is reduced, while the manufacturing and assembling cost is increased.

In view of the above problems, an object of the invention is to provide a structure of a solid-oxide fuel cell module capable of increasing the gas sealing reliability, while reducing manufacturing and assembling costs.

In order to achieve the above object, the present invention provides the following constitutions.

A fuel cell module according to an embodiment includes: a power-generating chamber that receives fuel cells; and a casing having a generally rectangular shape enclosing the power-generating chamber, wherein right and left side walls and an upper wall of the casing are hollow walls constituted of an outer shell member and an inner shell member disposed parallel to each with a predetermined distance therebetween to form a reaction gas circulation space, each of the outer shell member and the inner shell member is formed in a U-like shape in cross section, a reaction gas introduction member vertically extending downward from the inner shell member of the upper wall into the power-generating chamber and being communicated with the reaction gas circulation space to introduce a reaction gas into the power-generating chamber.

The fuel cell module according to an embodiment, wherein a waste gas circulation space is formed at the power-generating chamber side of the inner shell member of the right and left side walls by an inner wall for waste gas disposed parallel to the inner shell member with a predetermined distance therebetween, and an upper portion of the waste gas circulation space is communicated with the power-generating chamber.

The fuel cell module according to an embodiment, wherein the reaction gas introduction member is constituted of a pair of plates disposed parallel to each other with a predetermined distance therebetween to form a reaction gas introduction space, and a reaction gas introduction opening is formed in the plates in a lower portion of the reaction gas introduction space.

The fuel cell module according to an embodiment, wherein the reaction gas introduction member is disposed at both sides respectively right and left symmetrically with respect to the center of the upper wall.

The fuel cell module according to an embodiment, wherein one reaction gas introduction member is provided in a central position of the upper wall.

The fuel cell module according to an embodiment, wherein a meandering flow path is formed in the reaction gas circulation space of the right and left side walls by a plurality of partial partition plates disposed laterally alternately between the outer shell member and the inner shell member with a predetermined distance therebetween in a vertical direction.

The fuel cell module according to an embodiment, wherein a meandering flow path is formed within the waste gas circulation space by a plurality of partial partition plates disposed laterally alternately between the inner shell member and the inner wall for waste gas in the right and left side walls being interposed by a predetermined distance in a vertical direction.

The fuel cell module according to an embodiment, wherein one of front and rear side walls of the casing is sealed and the other is arranged to be opened and closed, and the side wall arranged to be opened and closed is formed with a piping aperture.

The fuel cell module according to an embodiment, wherein the front and rear side walls of the casing are arranged to be opened and closed, and the side walls arranged to be opened and closed are formed with a piping aperture.

The fuel cell module according to an embodiment, wherein one or a plurality of through holes penetrating at least one of the right and left side walls while sealing the reaction gas circulation space and the waste gas circulation space is provided.

The fuel cell module according to an embodiment, wherein a waste gas outlet storage chamber communicated with each of the waste gas circulation spaces in the right and left side walls and connected to a waste gas discharge tube is formed in the lower wall of the casing, and a reaction gas inlet storage chamber communicated with each of the reaction gas circulation spaces in the right and left side walls and connected to a reaction gas supply tube is formed under the waste gas outlet storage chamber.

The fuel cell module according to an embodiment further including a cell stack of a plurality of the fuel cells arrayed in a row, and a manifold fixing one end of the fuel cells, wherein the manifold is composed of an upper case and a lower case joined to each other, the upper case includes one or a plurality of openings in the upper face thereof and a circular portion formed with a turn-up portion turned inwardly enclosing the periphery of the opening, and the fuel cells are disposed vertically within the opening of the upper case with the one end thereof sealed by a sealing material.

The fuel cell module according to an embodiment further including a cell stack of a plurality of the fuel cells arrayed in a row via power collection members, rigid current removal members each disposed at both ends of the cell stack, and strip-like current removal pieces extending outwardly as a part of the current removal members.

The fuel cell module according to an embodiment further including a manifold fixing one end of the respective fuel cells, wherein one end of the current removal members is joined and fixed in an insulated state to the manifold.

The fuel cell module according to an embodiment further including a cell stack of a plurality of the fuel cells arrayed in a row, wherein the cell stacks are arranged in two rows parallel to each other within the power-generating chamber.

The fuel cell module according to an embodiment is arranged so that all of the right and left side walls and upper wall of the casing is formed in a hollow wall having a U-like shape in cross section as a reaction gas communication space, and the reaction gas introduction member is arranged to extend downwardly vertically from the upper wall into the power-generating chamber. The "reaction gas" may be an oxygen-containing gas or a fuel gas (hydrogen-rich gas) depending on the structure of the fuel cell used within the power-generating chamber. Also, in place of the fuel gas, a gas to be reformed (which is reformed within the power-generating chamber into a fuel gas) may be used.

In this invention, since the hollow wall constituting the casing has a U-like dome shape in cross section, the portion which is equivalent to the conventional heat exchanger and oxygen-containing gas chamber is formed as a continuous reaction gas circulation space. With this arrangement, the conventional joint portion between the heat exchanger and the oxygen-containing gas chamber, that is, the bottom plate of the oxygen-containing gas chamber is eliminated. Accordingly, the problem of gas leakage from the welded portion between the bottom plate and the flange is eliminated. As a result, the heat exchange efficiency, the self-sustained heating temperature and the power-generating efficiency are increased.

Also, since the bottom plate of the conventional oxygen-containing gas chamber is not necessary, the number of component parts is reduced. Further, since the welding of the flange is not required in the manufacturing process, the number of assembling steps is reduced resulting in a cost reduction.

Further, the reaction gas circulation space in the upper wall corresponding to the conventional oxygen-containing gas chamber abuts on the power-generating chamber being interposed by the inner shell member of the upper wall. Therefore, a higher temperature can be obtained than the conventional oxygen-containing gas chamber.

The fuel cell module according to an embodiment, at the power-generating chamber side of the right and left side walls as the hollow wall, the inner wall for waste gas is formed parallel thereto to form the waste gas circulation space. Therefore, the reaction gas circulation space and the waste gas circulation space are disposed abutting each other via one the inner shell member of the right and left side walls. The heat can be exchanged efficiently between the reaction gas and the waste gas.

The fuel cell module according to an embodiment, the reaction gas introduction member has the reaction gas introduction space formed by a pair of plates disposed in parallel, and releases the reaction gas from the introduction openings in the lower portion thereof into the power-generating chamber. Unlike the conventional fuel cell module in which a plurality of reaction gas introduction tubes are disposed in parallel along the cell stack in the longitudinal direction, since one or a small number of reaction gas introduction members may be disposed, manufacturing cost and assembling cost can be reduced.

The fuel cell module according to an embodiment is arranged so that the reaction gas introduction members are disposed at both sides right and left symmetrically with respect to the center of the upper wall. In the central space between the reaction gas introduction members, a desired number and/or shape of cell stacks, reformers and manifolds can be disposed and various design modes are available.

The fuel cell module according to an embodiment is arranged so that the reaction gas introduction member is disposed at the central area of the upper wall. Therefore, the cell stack, the reformer and the manifold can be disposed at both sides thereof. Since one or a plurality of reaction gas introduction members can be disposed linearly, the number of component parts can be reduced resulting in a cost reduction.

The fuel cell module according to an embodiment, by forming the meandering flow path in the reaction gas circulation space, a narrower flow path increases the flow speed and a longer flow path permits efficient heat exchange as well as uniform flow of the reaction gas is obtained.

The fuel cell module according to an embodiment, by forming the meandering flow path in the waste gas circulation space, a narrower flow path increases the flow speed and a longer flow path permits efficient heat exchange as well as uniform flow of the waste gas is obtained.

In the fuel cell module according to an embodiment, one of the front and rear side walls of the casing is closed and sealed, the other is arranged so as to be opened and closed. Therefore, the component elements within the power-generating chamber are accessible for repair and/or replacement. Furthermore, since the piping aperture is formed in the side wall arranged to be opened and closed, the supply tubes for fuel gas and/or gas to be reformed and the like can be easily laid. Compared to the conventional fuel cell module in which tubes are laid on the bottom, the component elements are accessed more easily, and entire height of the fuel cell module can be reduced into a compact size.

The fuel cell module according to an embodiment is accessible from both the front and rear side walls of the casing for repair and/or replacement.

Therefore, the tubes can be laid from both the front and rear side walls, and accordingly various designs are permitted.

In the fuel cell module according to an embodiment, one or more through holes that penetrate at least one of the right and left side walls is formed. Therefore, the heater, temperature sensor or the like can be inserted from the outside and disposed in the power-generating chamber.

In the fuel cell module according to an embodiment, the waste gas outlet storage chamber is formed in the lower wall of the casing being communicated with the waste gas circulation space. And further, the reaction gas inlet storage chamber space is formed under the waste gas outlet storage chamber being communicated with the reaction gas circulation space. By the formation of the reaction gas inlet storage chamber, after the reaction gas from the outside enters a large space of the reaction gas inlet storage chamber, the reaction gas enters the reaction gas circulation space having narrow right and left side walls. Therefore, a uniform flow can be obtained by guiding the reaction gas to flow from the larger flow path having a low pressure loss into the smaller flow path having a higher pressure loss. Accordingly, the meandering flow path may be eliminated from the reaction gas circulation space.

Furthermore, the reaction gas inlet storage chamber is located under the waste gas outlet storage chamber abutting the bottom thereof. Therefore, the reaction gas rises along the right and left side walls after being preheated by the waste gas. Compared to the case where the reaction gas inlet storage chamber is not formed, the heat loss in the right and left side walls is reduced. Contrarily, when the reaction gas inlet storage chamber is not formed, the low temperature reaction gas supplied from the outside rises along the right and left side walls.

In the fuel cell module according to an embodiment, by forming the turn-up portion in the opening of the upper case of the manifold, the effect that the stress generated due to the differences in the thermal expansion coefficients among the manifold, the fuel cells disposed in the opening and the sealing material fixing the fuel cells is reduced. As a result, an increased joint strength and a stable fixing state are ensured.

In the fuel cell module according to an embodiment, by providing strip-like current removal pieces extending outwardly as a part of the current removal members at both ends of the cell stack, since the current removal pieces are formed integrally as a part of the rigidity current removal members, there is no possibility that the current removal pieces fall off due to vibration and/or a shock.

In the fuel cell module according to an embodiment, by one end of the current removal member being joined and fixed in an insulated state to the manifold being, the current removal member is supported and fixed stably and the current removal member simultaneously functions as a press plate at both ends of the cell stack.

In the fuel cell module according to an embodiment, by the cell stacks being disposed in two rows in the power-generating chamber, one reaction gas introduction member or one row thereof can be formed between the two rows of cell stacks. Also, two reaction gas introduction members or two rows thereof may be disposed so as to sandwich the two rows of cell stacks. Compared to the conventional fuel cell module in which four rows of cell stacks are disposed, the number of the reaction gas introduction members can be largely reduced resulting in a simple structure. Furthermore, the number of sealing steps to attach the reaction gas introduction members can be largely reduced. As a result, the reliability of the gas sealing is increased and the cost is largely reduced.

BRIEF DESCRIPTION OF THE DRAWINGS

FIG. 5A is a perspective view of a part including an inner wall for waste gas, a waste gas outlet flow path, and a waste gas discharge tube as viewed from the outer side of a power-generating chamber, and FIG. 5B is a perspective view thereof as viewed from the central side of the power-generating chamber.

FIG. 14A is a plan view showing one cell stack of a pair of cell stacks shown in FIG. 10, FIG. 14B is a right side view thereof, FIG. 14C is a front side view thereof, and FIG. 14D is an enlarged view of a portion A

FIG. 16A is an external perspective view of one current removal member, and FIG. 16B is an external perspective view of the other current removal member.

FIG. 19A is a plan view showing a pair of cell stacks and a manifold, FIG. 19B is a right side view thereof, FIG. 19C is a B-cross sectional view of FIG. 19B, and FIG. 19D is rear side view thereof.

FIG. 21A is a plan view showing a lower case of the manifold, FIG. 21B is a right side view thereof, FIG. 21C is a H-cross sectional view of FIG. 21A, and FIG. 21D is an I-cross sectional view of FIG. 21A.

FIG. 22A is a plan view showing an upper case of the manifold, FIG. 22B is a right side view thereof, FIG. 22C is a G-cross sectional view of FIG. 22A, and FIG. 22D is a F-cross sectional view of FIG. 22A.

FIG. 24A is an external perspective view of an embodiment of the reformer as viewed diagonally from the rear side thereof, FIG. 24B is an exploded view thereof of the reformer in FIG. 24A, FIG. 24C a lateral sectional view of a vaporizing and mixing unit, and FIG. 24D is a lateral sectional view of a reforming unit.

FIGS. 25A and 25B are exploded views of reformers of another embodiment as viewed diagonally from the front side thereof.

BRIEF DESCRIPTION OF REFERENCE NUMERALS

Figure 1:
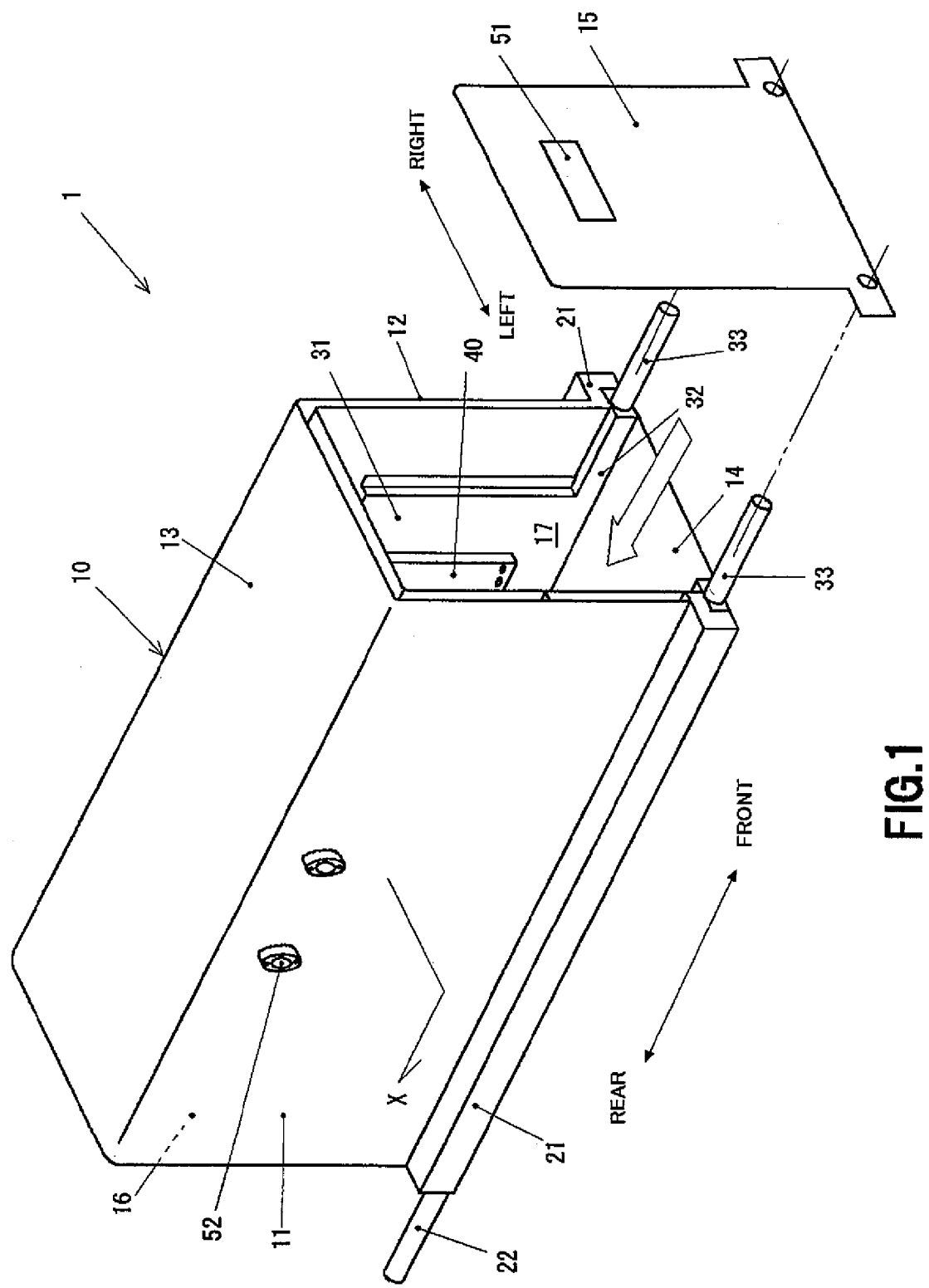
FIG. 1 is an external perspective view of a fuel cell module according to an embodiment of the invention.

1: fuel cell module
10: casing
11: left side wall
12: right side wall
13: upper wall
14: lower wall
15: front side wall
16: rear side wall
17: power-generating chamber
20: reaction gas circulation space
30: waste gas circulation space
40: reaction gas introduction member

DETAILED DESCRIPTION OF THE INVENTION

Hereinafter, embodiments of the invention will be described with reference to the drawings. A solid-oxide fuel cell module of the invention is preferably applicable to a distributed power generation, particularly, to a 0.5 to 1.5 kW class domestic fuel cell module that performs a load following operation.

FIG. 1 is an external perspective view of an embodiment of a solid-oxide fuel cell module according to the invention. A fuel cell module 1 has a generally rectangular casing 10, and the casing 10 encloses a power-generating chamber 17. Although not shown in FIG. 1, the power-generating chamber 17 includes a cell stack having a plurality of solid-oxide fuel cells arranged in a line and a fuel cell stack device composed of a manifold (fuel gas case) and/or a reformer and the like (which will be described later in detail) disposed therein. Hereinafter, the casing 10 will be described while indicating the direction thereof; i.e., front-rear direction or right and left direction, using double-headed arrows.

The casing 10 is constructed of six wall members including four side walls, being a left side wall 11, a right side wall 12, a front side wall 15 and a rear side wall 16, an upper wall 13 and a lower wall 14. The casing 10 may be formed of a metal plate or box by shaping the same. The wall members except the front side wall 15 are integrally molded or joined to each other. Only the front side wall 15 is arranged to open and close. FIG. 1 shows the state that the front side wall 15 is opened. It should be noted that FIG. 1 shows only the case that only the front side wall 15 is arranged to open and close, but another embodiment may be arranged so that only the lower wall 14 or rear side wall 16 can be opened and closed. Further, both of the front and rear walls may be arranged to open and close. In the example shown in FIG. 1, the repair, the replacement and/or the like of various component elements within the power-generating chamber 17 is/are carried out with the front side wall 15 opened. The cell stack is inserted in a direction indicated with an outlined arrowhead. The front side wall 15 is formed with a piping aperture 51, and gas supply tubes for supplying various kinds of gases are disposed within the power-generating chamber 17 therethrough. The gas supply tubes include, for example, a fuel gas supply tube or a supply tube for gas to be reformed, and further a supply tube for water or vapor also disposed, if necessary.

The left and right side walls 11 and 12 are provided with an inlet flow path case 21 at the respective bottom ends thereof for supplying a reaction gas to the surrounding area of the cell stack within the power-generating chamber 17. The inlet flow path case 21 for reaction gas has an elongated shape extending along the full length of the casing 10 in a front-rear direction thereof. A reaction gas supply tube 22 is connected to the rear end of the respective cases 21. The reaction gas is, for example, an oxygen-containing gas. Further, inside the inlet flow-path case 21 for reaction gas, an outlet flow path case 32 for waste gas is provided adjacent thereto. The outlet flow path case 32 for waste gas also has an elongated shape extending along the full length of the casing 10 in a front-rear direction thereof. A waste gas discharge tube 33 is connected to the front end of the case 32. The waste gas includes a part of the oxygen-containing gas and the fuel gas, which are not used for power generation, and a combustion gas thereof.

In FIG. 1, although the entire view of the inside of the power-generating chamber 17 is not shown, a part of a reaction gas introduction member 40 extending downwardly vertically from the upper wall 13 is shown. Also, a part of an inner wall 31 for waste gas disposed inside the right side wall 12 is shown (the same at the left side wall 11). A waste gas circulation space formed inside the inner wall 31 for waste gas is communicated with the outlet flow path case 32 for waste gas. Description of the above will be given later.

Basically, the fuel cell module of the invention is preferably arranged to have a right-left symmetrical structure to obtain a stable power output.

In the following description, an example will be given in which the oxygen-containing gas is supplied from the reaction gas supply tube 22, and from the gas supply tube disposed through the piping aperture 51 in the front side wall, the fuel gas (or a gas to be reformed to the fuel gas) is supplied. The above structure may differ depending on the structure of the oxygen electrode and the fuel electrode in the used fuel cells. In another type of fuel cells, the fuel gas (or gas to be reformed) may be supplied, contrarily, from the reaction gas supply tube 22, and the oxygen-containing gas is supplied from the gas supply tube through the piping aperture 51. The invention is applicable to any of the above cases. Therefore, the reaction gas may be the oxygen-containing gas or the fuel gas (or gas to be reformed).

Figure 2:
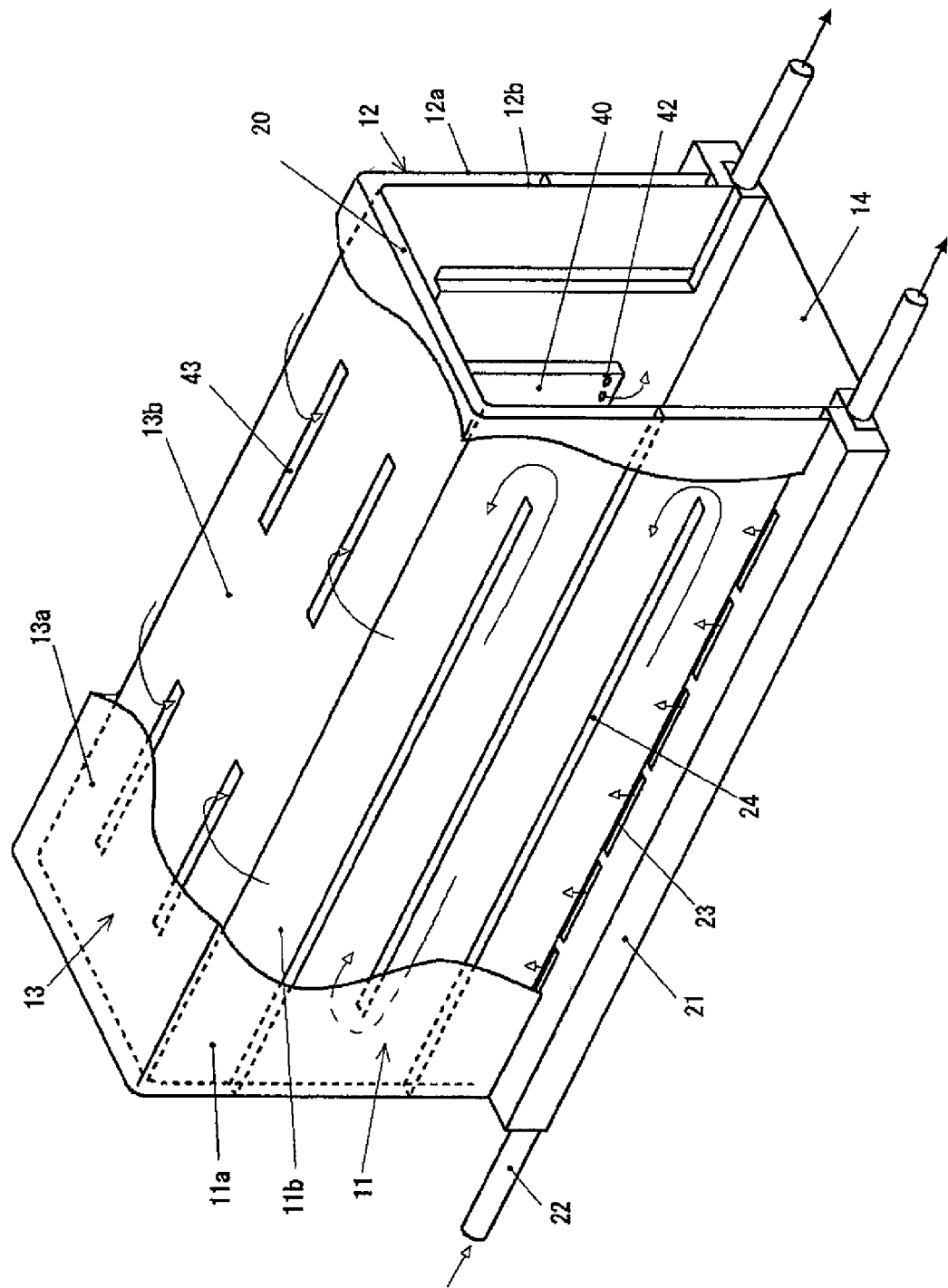
FIG. 2 is a perspective view of the fuel cell module in FIG. 1, in which a part of a casing is cut away and a front wall is removed.

FIG. 2 is a perspective view of the casing 10 of the fuel cell module shown in FIG. 1, in which the front side wall 15 and a part of the casing 10 are removed therefrom. The left side wall 11, the right side wall 12 and the upper wall 13 of the casing are hollow walls constituted of outer shell members 11a, 12a and 13a and inner shell members 11b, 12b and 13b, which are disposed parallel to each other with a predetermined distance therebetween, thereby forming a continuous reaction gas circulation space 20. The outer shell members 11a, 12a and 13a may be formed by integrally bending and shaping a single plate, or by joining three plates to each other. The inner shell members 11b, 12b and 13b also may be formed in the same manner as above.

FIG. 2 shows the inner shell members 11b and 13b being exposed by taking away a part of the outer shell members 11a, 12a and 13a. The outer shell members 11a, 12a and 13a and the inner shell members 11b, 12b and 13b are disposed parallel to each other in a right-left direction and vertical direction to form a U-like shape, i.e., a dome-like shape, in section. Therefore, the entire hollow wall forms a U-like shape, i.e., a dome-like shape, in section.

Further, within the reaction gas circulation space on the left side wall 11 (the same on the right side wall 12), a plurality of partial partition plates 24, which is alternately disposed laterally being bridged between the outer shell 11a and the inner shell 11b with a predetermined distance therebetween in the vertical direction, thereby forming a meandering flow path. The lower end of the meandering flow path is located on the upper face of the inlet flow path case 21 for reaction gas. Here, a plurality of flow-in slits 23 is appropriately formed in the upper wall of the inlet flow path case 21 for reaction gas.

Furthermore, in the inner shell 13b of the upper wall 13, a plurality of communication holes 43 communicated with the reaction gas introduction member 40 extending downwardly vertically into the power-generating chamber 17 is formed. Although not shown in FIG. 2, a pair of reaction gas introduction members 40 is formed right and left symmetrically with respect to the center of the upper wall 13. Since each of the reaction gas introduction members 40 have two communication holes 43, four communication holes 43 are formed.

Referring to FIG. 2, the flow of the reaction gas supplied from the reaction gas supply tube 22 on the casing 10 will be described (indicated with white arrows). The reaction gas flows into the inlet flow path case 21 for reaction gas through the flow-in slits 23 and enters the meandering flow path in the reaction gas circulation space. The reaction gas flows upward from the lower portion toward the upper portion of the meandering flow path while meandering therealong. When the reaction gas reaches the upper end of the meandering flow path, the reaction gas flows into the reaction gas circulation space in the upper wall 13. The reaction gas enters the reaction gas introduction members 40 through the communication holes 43 in the inner shell 13b of the upper wall 13, and is released into the power-generating chamber 17 through introduction openings 42 formed in a lower portion of the reaction gas introduction member 40.

Figure 3:
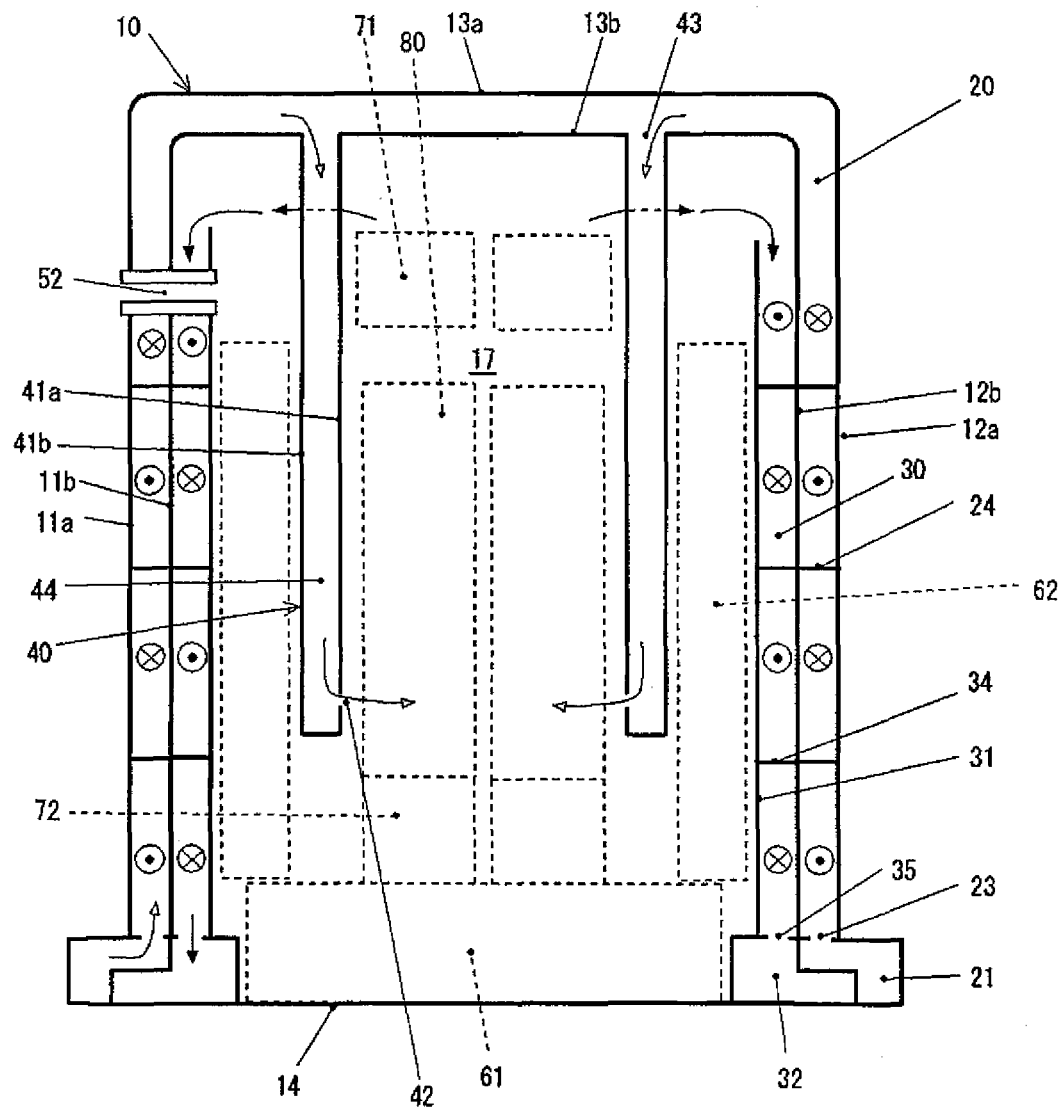
FIG. 3 schematically shows an X-cross section of FIG. 1.

FIG. 3 schematically shows an X-cross section of FIG. 1. The reaction gas circulation space 20 of the hollow wall is formed by the outer shell members 11a, 12a and 13a and the inner shell members 11b, 12b and 13b as described above with reference to FIG. 2 (it should be noted that the width of the reaction gas circulation space 20 is expressed being virtually enlarged in dimension and is the same in the following similar sectional views). Each of the reaction gas introduction members 40 forms a reaction gas introduction space 44 with a pair of plates 41a and 41b disposed in parallel with a predetermined distance therebetween. One plate 41a is formed with introduction openings 42 in a lower portion of the reaction gas introduction space 44. In the example shown in FIG. 3, the reaction gas introduction members 40 are provided right-left symmetrically at both sides with respect to the center of the upper wall. The introduction openings 42 are formed in the plate 41a located at the center side in the pair of the plates so that the reaction gas is released toward the central area of the power-generating chamber 17. In FIG. 3, the flow of the reaction gas is schematically indicated with the white arrows and the flow of the waste gas is schematically indicated with the black arrows.

As shown in FIG. 3, each of the right and left side walls is provided with an inner wall 31 for waste gas disposed in parallel with a predetermined distance therebetween at the side of the power-generating chamber 17 of the respective inner shell members 11b and 12b. With this arrangement, a waste gas circulation space 30 is formed (the width of the reaction gas circulation space 30 is expressed being virtually enlarged in dimension and it is the same in the following similar sectional views). The upper portion of the waste gas circulation space 30 is communicated with the power-generating chamber 17. The same as the reaction gas circulation space 20, a meandering flow path is formed within the waste gas circulation space 30. That is, the meandering flow path is formed in such a way that a plurality of partial partition plates 34 is disposed alternately with a predetermined distance therebetween in the vertical direction. The respective partial partition plates 34 are disposed laterally between each of the inner shell members 11b and 12b and the inner wall 31 for waste gas of the right and left side walls. This will be described later in detail with reference to FIG. 5.

A through hole 52 in the left side wall penetrates both the reaction gas circulation space 20 and the waste gas circulation space 30 while ensuring the sealing thereof. Through the through hole 52, a heater and/or a temperature sensor can be inserted to reach the power-generating chamber 17. One or more through holes 52 may be formed in at least one of the right and left side walls. For example, one side wall may be formed with two through holes or the right and left side walls may be formed with one through hole respectively, if necessary.

FIG. 3 schematically shows an example of component elements disposed within the power-generating chamber 17, which are indicated with broken lines. In the central area of the power-generating chamber 17, two cell stacks 80 are disposed in parallel, and reformers 71 are disposed thereabove being supported by an appropriate supporting means. Each of the cell stacks 80 are mounted onto the upper face of the respective manifolds 72 to supply the fuel gas to a fuel electrode of the respective fuel cells in the cell stacks 80 through the upper face of the manifolds 72. Spaces between the reaction gas introduction member 40 and the inner wall 31 for waste gas, and between the manifolds 72 and the lower wall 14 are appropriately filled with heat insulators 61 and 62.

Here, the flow of the gases and generation of the electric power in the fuel cell module 1 is schematically described. For example, a gas to be reformed is supplied to the reformers 71 through a gas supply tube, and a hydrogen-rich fuel gas reformed by a reforming catalyst is sent to the manifolds 72. And further, the gas is supplied to the fuel electrode of the fuel cells in the cell stacks 80 through the manifolds 72. On the other hand, the oxygen-containing gas is supplied through a reaction gas supply tube 22. And further, the gas is supplied into the power-generating chamber 17 through the reaction gas circulation space and the reaction gas introduction member (that is, supplied to the oxygen electrode of the fuel cells), and thus a reaction occurs in the fuel cells and electric power is generated. The fuel cells and the power generating reaction will be described later in detail with reference to FIG. 15.

The fuel gas and the oxygen-containing gas, which remain without being consumed for power generation, flow to an upper area of the power-generating chamber 17. When a combustion device is provided, the gases are ignited and combusted therein. Thus, the gases are changed into waste gas. Due to the power generation in the cell stack 80 and due to the combustion of the fuel gas and the oxygen-containing gas, the temperature within the power-generating chamber 17 is raised to a high temperature of, for example, about 700 to 1,000° C. The high temperature waste gas enters the waste gas circulation space 30 through the upper end thereof, and descends along the meandering flow path. And further, the gas enters the outlet flow path case 32 for waste gas through a plurality of discharge slits 35 and is discharged through the waste gas discharge tubes 33. While the high temperature waste gas descends along the meandering flow path, the heat of the waste gas preheats the low temperature reaction gas, which ascends along the meandering flow path neighboring the reaction gas circulation space 20, thus heat exchange is performed.

Figure 4B:
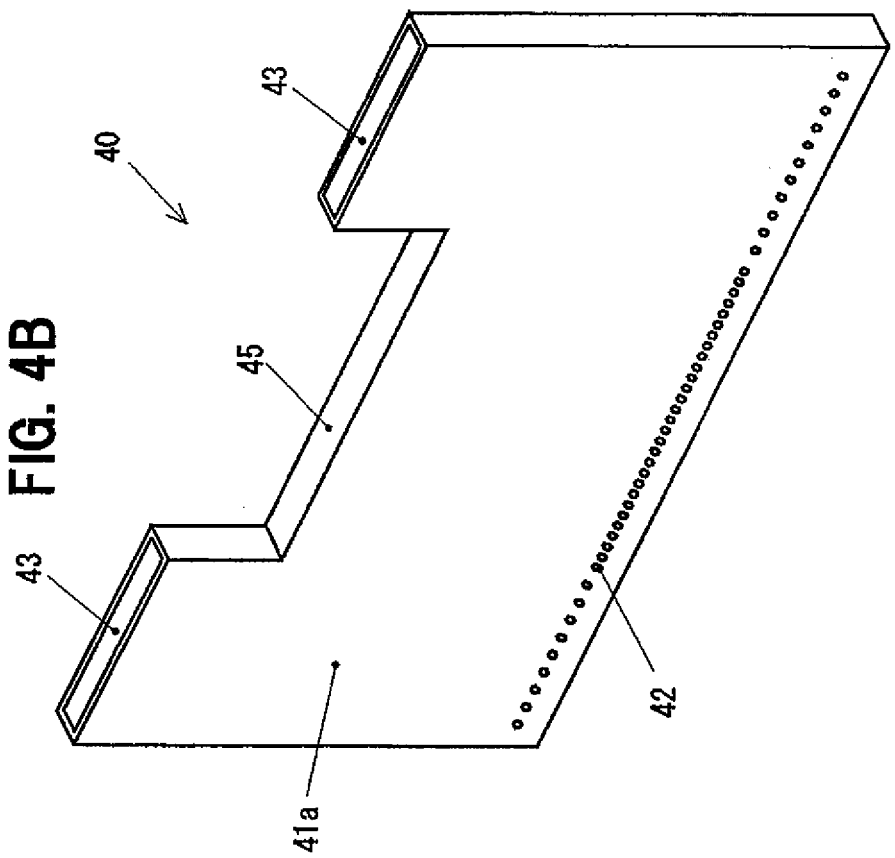
FIG. 4B is a perspective view thereof as viewed from the other side thereof.
Figure 4A:
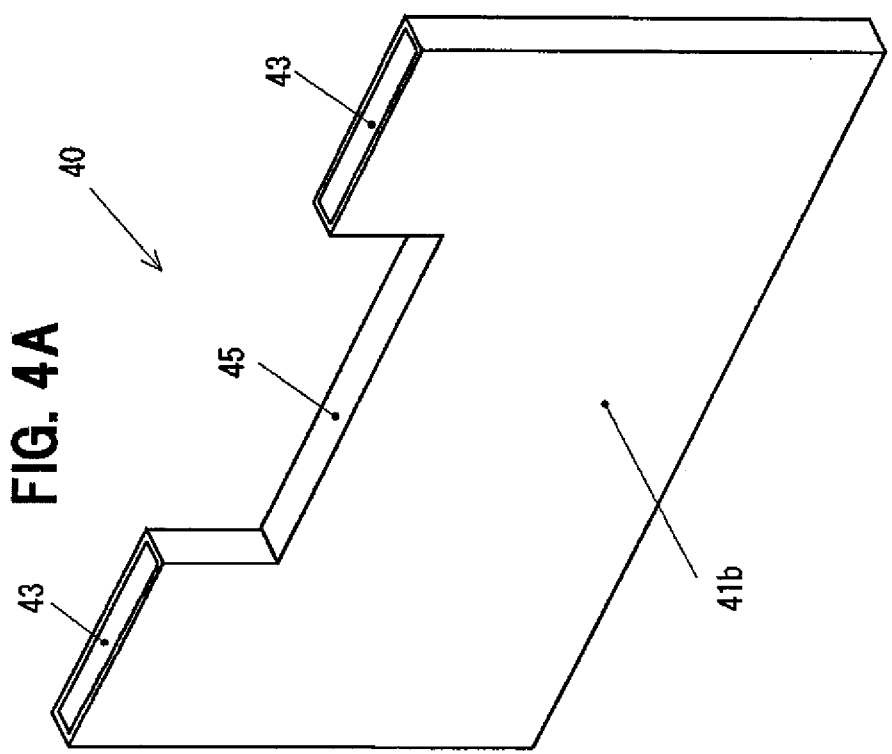
FIG. 4A is a perspective view of a reaction gas introduction member as viewed from one side thereof.

FIG. 4A is a perspective view of the reaction gas introduction member 40 shown in FIGS. 1 to 3 as viewed from the outside of the power-generating chamber; and FIG. 4B is a perspective view thereof as viewed from the central area of the power-generating chamber. The reaction gas introduction member 40 has an upstanding flat box-like shape having a hollow space sandwiched by a pair of plates 41a and 41b. Within the power-generating chamber, the reaction gas introduction member 40 is mounted so that the longitudinal direction thereof agrees with a disposition direction of the fuel cells in the cell stacks. In the upper end of the reaction gas introduction member 40, a communication hole 43 communicated with the reaction gas circulation space is opened. As shown in FIG. 3, the reaction gas introduction member 40 is formed with a concave portion 45 in the central area of the upper end thereof. The concave portion 45 is a path for allowing the waste gas to pass from the central area of the power-generating chamber to the waste gas circulation space therethrough. A plurality of introduction openings 42 for releasing the reaction gas is appropriately formed in a lower portion of a face 41a facing to the central side of the power-generating chamber. Generally, a conventional reaction gas introduction member tube is made of a ceramic. However, the reaction gas introduction member 40 may be formed of a metal material.

FIG. 5A is a perspective view of a portion including the inner wall 31 for waste gas, the outlet flow path case 32 for waste gas, and the waste gas discharge tube 33 as viewed from the outside of the power-generating chamber; and FIG. 5B is a perspective view thereof as viewed from the central area of the power-generating chamber. The inner wall 31 for waste gas is a flat plate, and at both ends thereof, a bent portion 31a for defining the width of the waste gas circulation space is formed respectively. The edge portion of the bent portions 31a is joined to the inner shell of the left side wall or right side wall. Within the waste gas circulation space, the meandering flow path is formed by a plurality of partial partition plates 34 provided alternately with a predetermined distance therebetween in the vertical direction. The lower end of the meandering flow path is located above the upper face of the outlet flow path case 32 for waste gas, and in this portion of the upper wall of the outlet flow path case 32 for waste gas, the plurality of discharge slits 35 is formed. Any of the component parts may be formed of a metal material.

Black arrows in FIG. 5A indicate the flow of the waste gas. The waste gas flows into the waste gas circulation space through the upper end thereof, and descends along the meandering flow path. The waste gas further enters the outlet flow path case 32 for waste gas through the discharge slits 35 and is discharged through the waste gas discharge tube 33.

Figure 6:
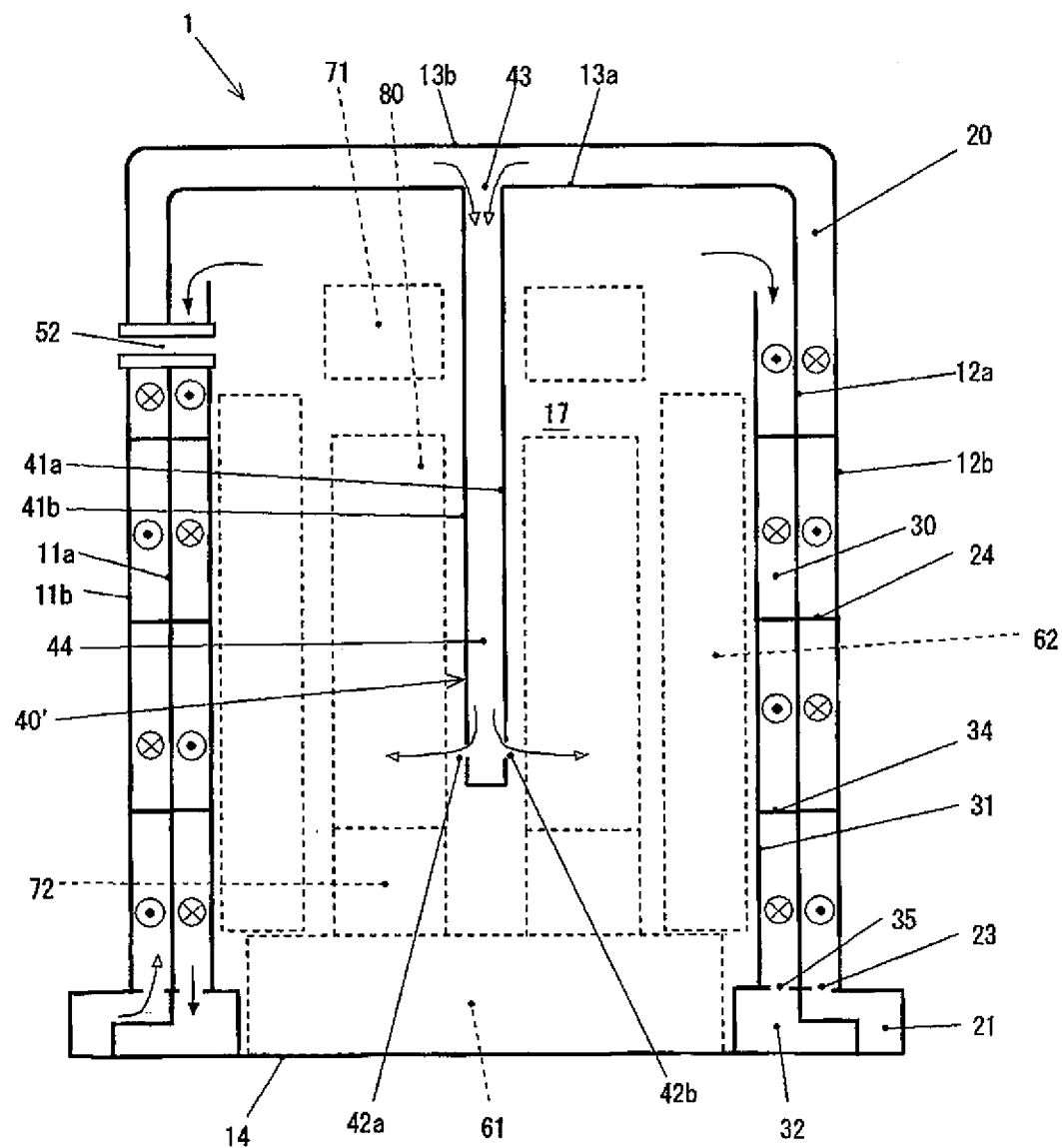
FIG. 6 is a sectional view of a fuel cell module according to another embodiment of the invention equivalent to FIG. 3.

FIG. 6 is a sectional view of a fuel cell module according to another embodiment of the invention, which is equivalent to FIG. 3. In this embodiment, a single reaction gas introduction member 40' extending downwardly vertically from the inner shell 13a of the upper wall is provided in the central area of the upper wall. The reaction gas introduction member 40' in FIG. 6 is formed with a plurality of introduction openings 42a and 42b, at both sides thereof, in the lower portion of a pair of plates 41a and 41b constituting the reaction gas introduction space. This arrangement releases the reaction gas from the central area of the power-generating chamber to both sides (indicated with white arrows). In further another embodiment, the reaction gas introduction member 40' may be constituted of a plurality of tubes disposed extending vertically in the longitudinal direction thereof at appropriate distances from each other.

Figure 7:
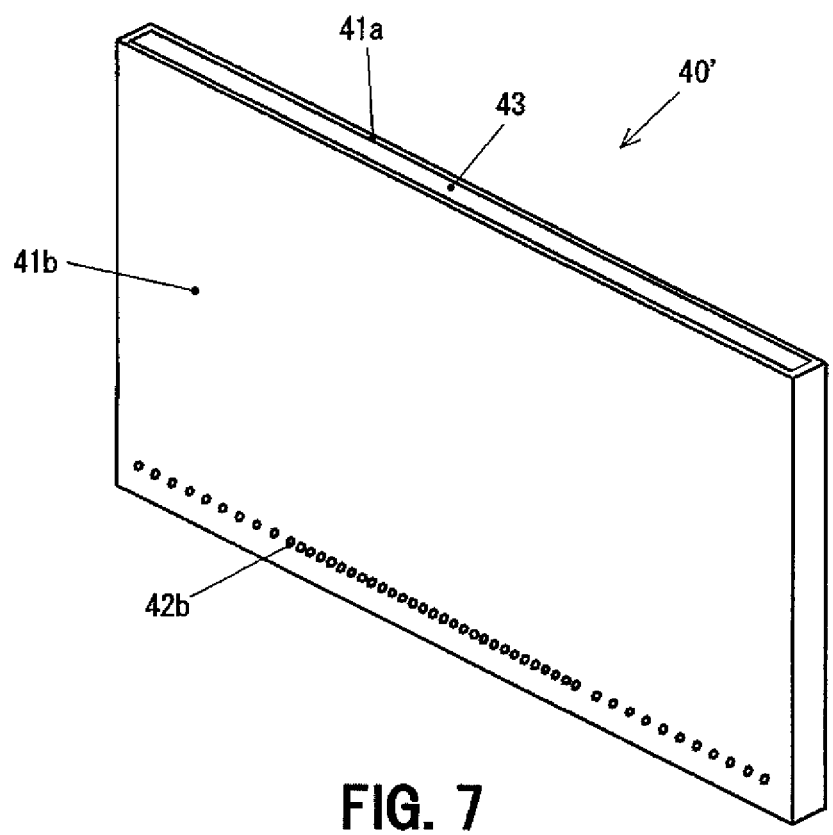
FIG. 7 is an external perspective view of a reaction gas introduction member according to the embodiment shown in FIG. 6.

FIG. 7 is an external perspective view of the reaction gas introduction member 40' in the embodiment shown in FIG. 6. Different from the embodiment in FIG. 4, since the reaction gas introduction member 40' is provided at the central area of the power-generating chamber, it is not necessary to form a concave portion as the waste gas path in the upper end thereof. Therefore, a single communication hole 43 communicated with the reaction gas circulation space is continuously formed extending in the longitudinal direction thereof. In FIG. 7, although only the introduction openings 42b on one side of the reaction gas introduction member 40' are expressed, the same introduction openings are formed at the opposite side thereof in the same manner. In order to supply a larger amount of the reaction gas in the central area as viewed in a cell array direction in the cell stack, the introduction openings 42a, 42b are formed, in the central area, with a shorter distance therebetween. This arrangement ensures cooling down of the central area of the cell stack which easily becomes a high temperature.

Figure 8:
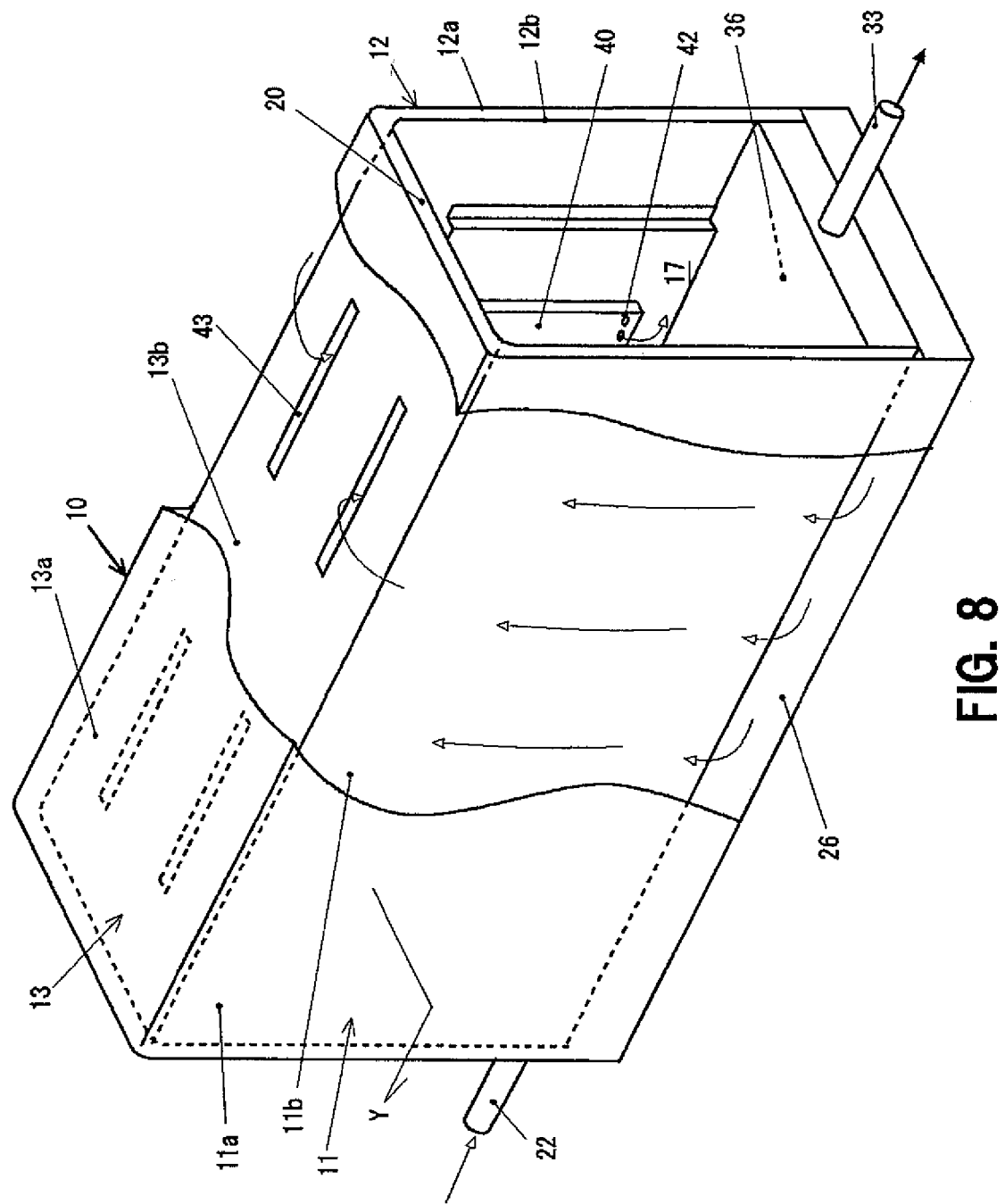
FIG. 8 is an external perspective view of a fuel cell module according to further another embodiment of the invention.
Figure 9:
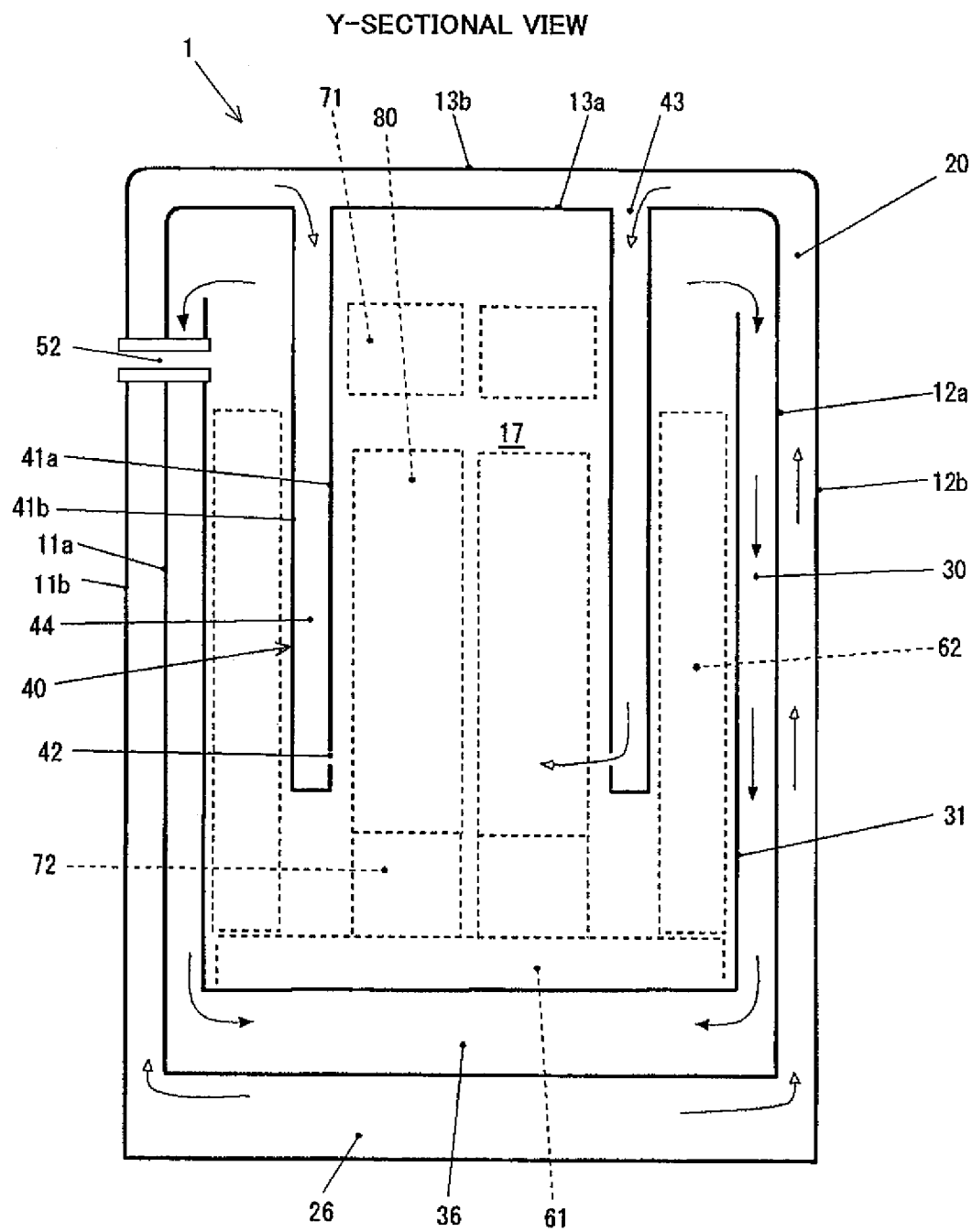
FIG. 9 schematically shows a Y-cross section of FIG. 8.

FIG. 8 is an external perspective view of a fuel cell module according to further another embodiment of the invention. FIG. 9 schematically shows a Y-cross section of the fuel cell module in FIG. 8. The points different from the embodiment shown in FIG. 1 is that a waste gas outlet storage chamber 36 and a reaction gas inlet storage chamber 26 are provided in a lower wall portion of the casing 10. The waste gas outlet storage chamber 36 is provided immediately under the power-generating chamber 17 and both sides thereof are communicated with the waste gas circulation space 30 formed in the right and left side walls at the right and left side thereof and a waste gas discharge tube 33 is also connected to the waste gas outlet storage chamber 36 at the front end thereof.

The reaction gas inlet storage chamber 26 is provided immediately under the waste gas outlet storage chamber 36, and the right and left sides thereof are communicated with the reaction gas circulation space 20 formed in the right and left side walls. A reaction gas supply tube 22 is connected to the rear end of the reaction gas inlet storage chamber 26. As indicated with white arrows, after the flow of the reaction gas supplied from the reaction gas supply tube 22 enters a large space of the reaction gas inlet storage chamber 26, it then enters the reaction gas circulation space 20 having narrow right and left side walls. The reaction gas flows from the large space having a lower pressure loss into a small space having a higher pressure loss, thereby ensuring a uniform flow. In this embodiment, with the effect of this arrangement, the meandering flow path may be omitted (needless to say, the meandering flow path may be provided optionally). Further, since the reaction gas inlet storage chamber 26 is provided immediately under the large space of the waste gas outlet storage chamber 36, the reaction gas is imparted with heat from the high temperature waste gas. In the preheated state, there is ascending in the reaction gas circulation space 20 in the right and left side walls, and the heat loss in the walls at both sides is reduced.

The other points are identical to those in the embodiments shown in FIGS. 1 to 5. After ascending in the reaction gas circulation space 20 in the right and left side walls, the reaction gas flows into the reaction gas introduction member 40 through the communication hole formed in the inner shell member 13*a* of the upper wall and the reaction gas is released into the power-generating chamber 17 through the introduction openings 42 in the lower portion thereof.

Figure 10:
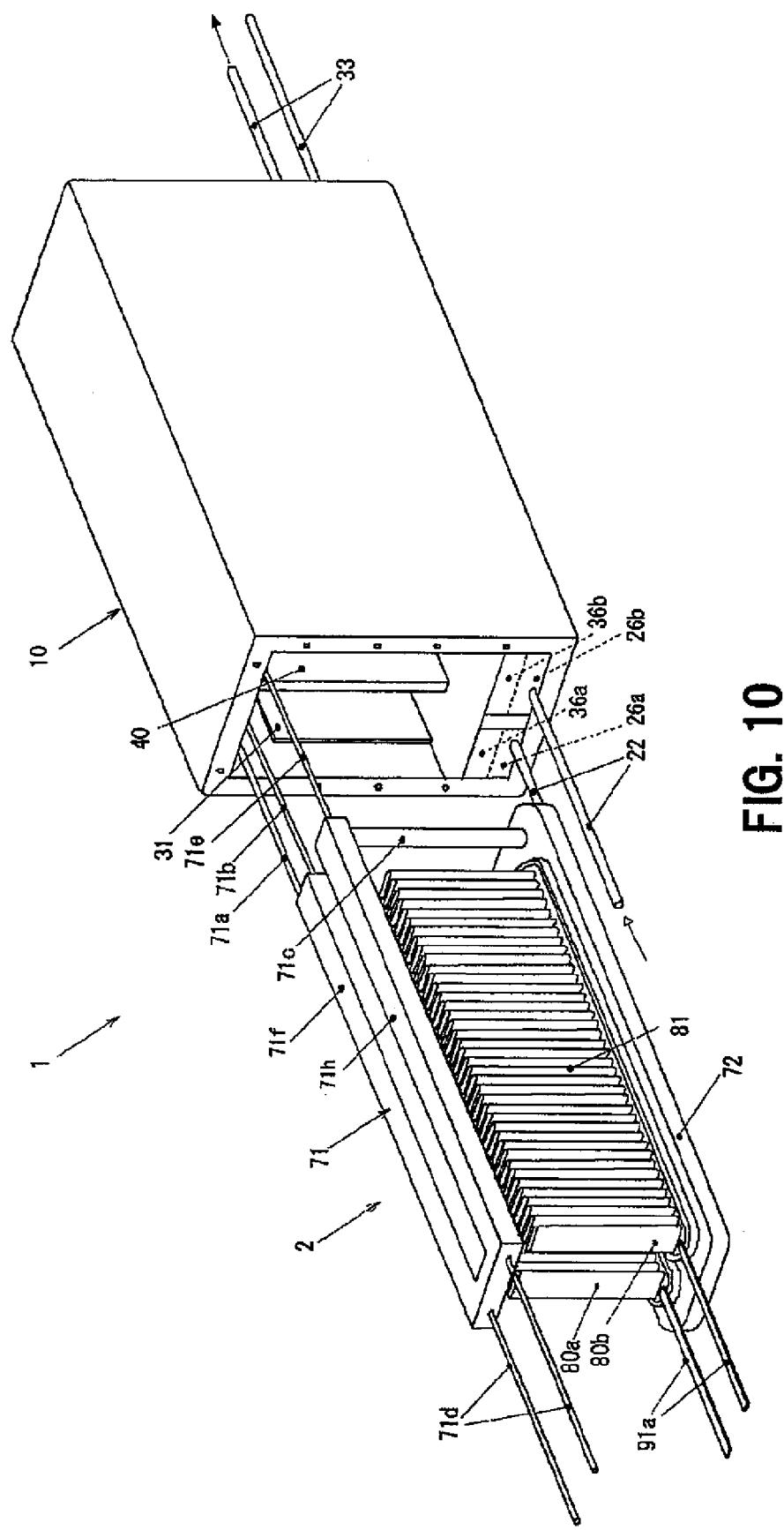
FIG. 10 is an external perspective view of a fuel cell module according to further another embodiment of the invention.

FIG. 10 is an external perspective view of a fuel cell module according to further another embodiment of the invention. The front-rear direction and the right and left direction are identical to those in FIG. 1. FIG. 10 shows the state in which the front side wall (not shown) of the casing 10 is opened and a fuel cell stack device 2, which is received therein, is pulled out to the front side.

Figure 11:
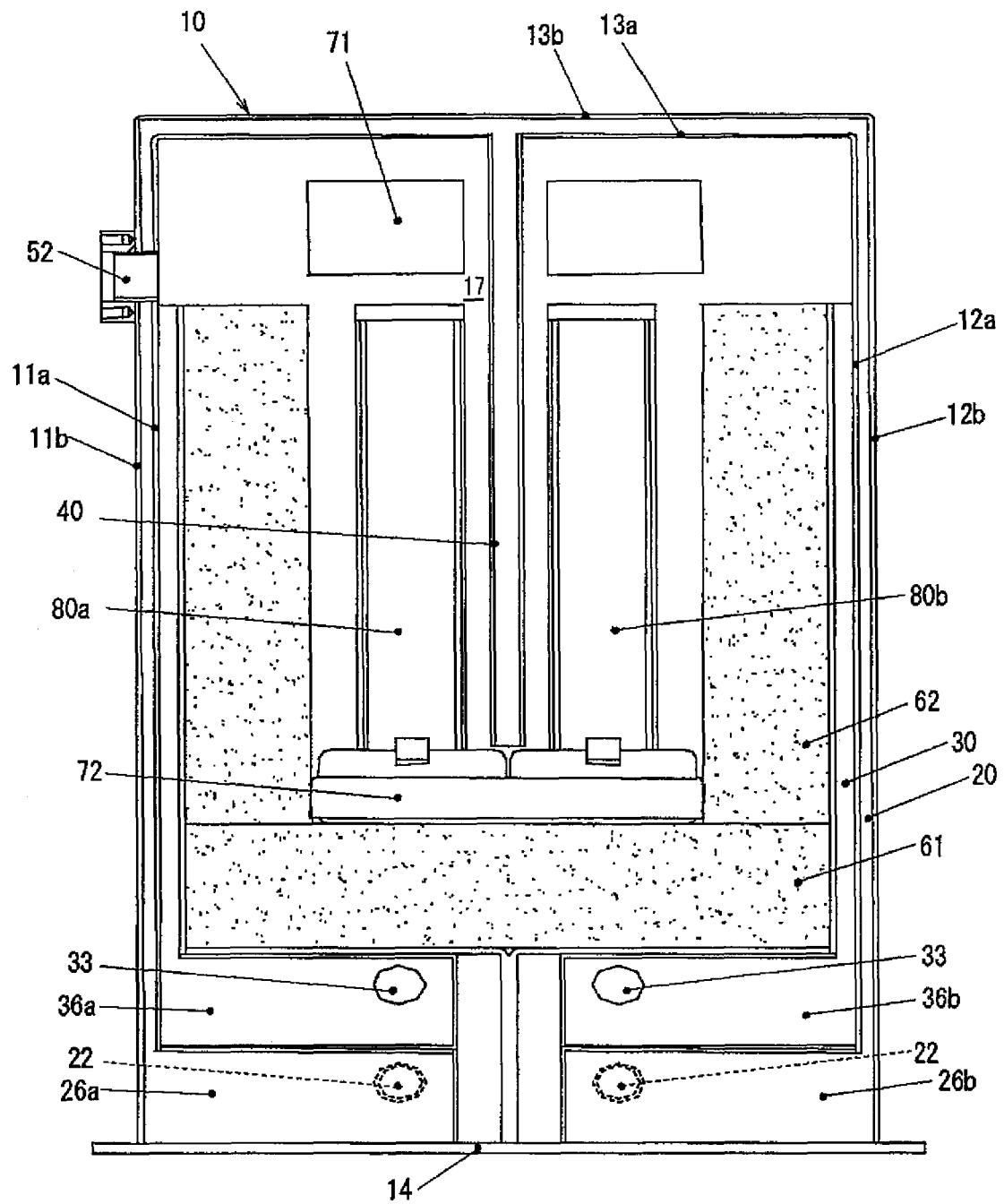
FIG. 11 is a sectional view of the fuel cell module in FIG. 10 equivalent to FIG. 9.

FIG. 11 is a sectional view of the fuel cell module in FIG. 10, which is equivalent to FIG. 9 (fuel cell stack device is received therein).

The casing 10 shown in FIG. 11 is a modification of the embodiment shown in FIG. 9. On the lower wall portion, there are two waste gas outlet storage chambers 36*a* and 36*b* and two reaction gas inlet storage chambers 26*a* and 26*b*, which are formed being separated respectively at the center of the casing 10.

The left waste gas outlet storage chamber 36*a* is communicated with the waste gas circulation space 30 in the left side wall and the right waste gas outlet storage chamber 36*b* is communicated with the waste gas circulation space 30 in the right side wall. The waste gas outlet storage chambers 36*a* and 36*b* are connected to the waste gas discharge tube 33 at the rear end thereof.

The left reaction gas inlet storage chamber 26*a* is communicated with the reaction gas circulation space 20 in the left side wall and the right reaction gas inlet storage chamber 26*b* is communicated with the right side wall reaction gas circulation space 20. The respective waste gas outlet storage chambers 36*a* and 36*b* are connected to the reaction gas supply tube 22 at the front end thereof.

The other points of the casing 10 in FIG. 11 are the identical to those in the embodiment shown in FIG. 6. After ascending the reaction gas circulation spaces 20 in the right and left side walls, the reaction gas flows into the reaction gas introduction member 40 through the communication hole formed in the inner shell member 13*a* of the upper wall and the reaction gas is released into the power-generating chamber 17 from the lower portion thereof.

Figure 12A:
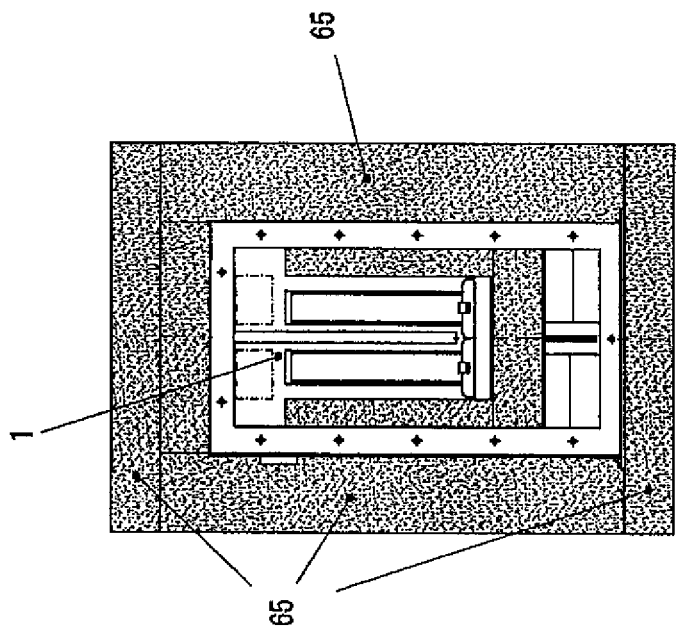
FIGS. 12A and 12B are sectional views of a fuel cell module of the invention along a front-rear direction a right and left direction thereof in the state in which an external heat insulating material is disposed on the external face of the casing.
Figure 12B:
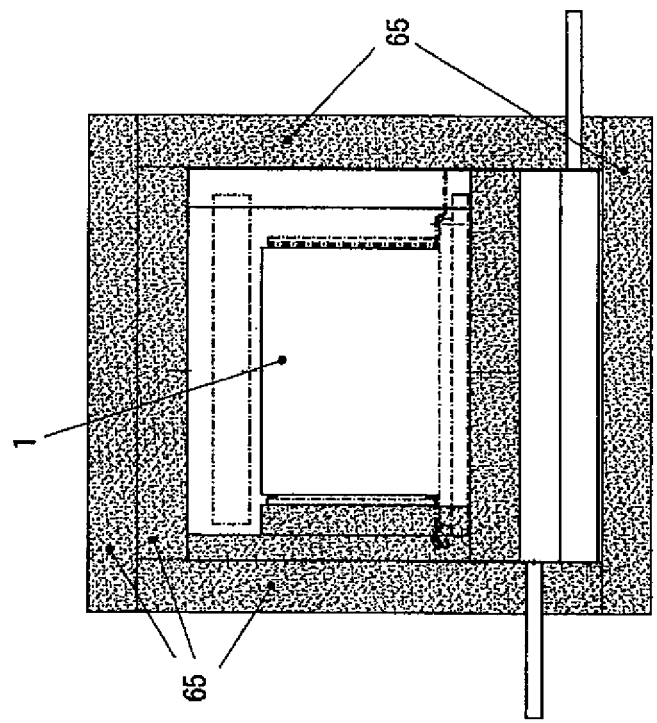

FIGS. 12A and 12B are sectional views of a fuel cell module of the invention along a front-rear direction a right and left direction thereof in the state in which an external heat insulating material 65 is disposed on the external face of the casing. In order to prevent heat dissipation from the external face of the fuel cell module 1, the external face of the casing is entirely covered with the external heat insulating material 65.

Figure 13:
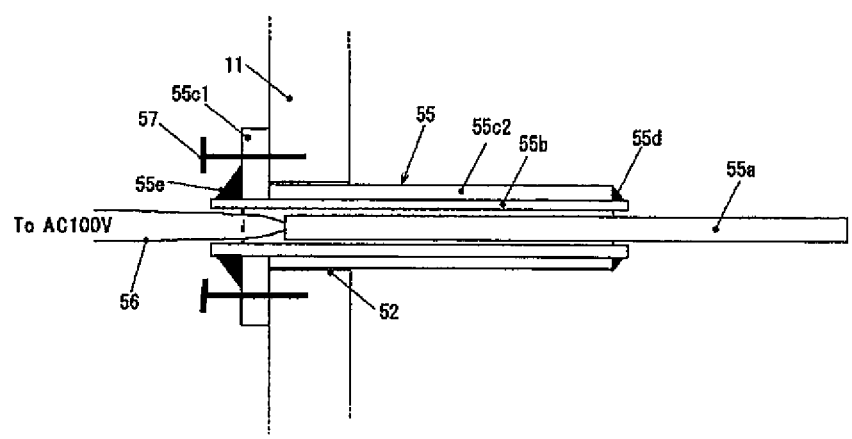
FIG. 13 is a sectional view showing an embodiment in which a heater is inserted through a side wall of the casing.

FIG. 13 is a sectional view showing an embodiment of the heater attached to the casing 10 in the above-described embodiments. A heater 55 is inserted into the through hole 52 formed in the side wall 11 (the through hole may be formed in another side wall). In the heater 55, a heater body 55*a* of a ceramic heater is disposed along the axial line thereof. One end of the heater body 55*a* extends up to the power-generating chamber (not shown), and the other end thereof is connected to a metal wire 56 for supplying power from an AC power source. Further, the heater body 55*a* is covered with a heater holding tube 55*c*2 disposed concentrically at a distance. The heater holding tube 55*c*2 is fitted with the through hole 52 while sealing the same. The outer end portion of the heater holding tube 55*c*2 is provided with a fixing plate 55*c*1 like a flange, and the fixing plate 55*c*1 is fixed onto the external face of the side wall 11 with screws 57 or the like.

Further, between the heater body 55*a* and the heater holding tube 55*c*2, an alumina tube 55*b* is disposed. Both ends of the alumina tube 55*b* protrude respectively penetrating the heater holding tube 55*c*2 and the fixing plate 55*c*1, and the protruding portions are fixed to the heater holding tube 55*c*2 and the fixing plate 55*c*1 with a cement 55*e*. This arrangement reliably insulates the fuel cell module electrically from the metal wire 56.

Now, the fuel cell stack device in the fuel cell module according to the embodiment of the invention will be described below.

Referring to FIG. 10 again, the fuel cell stack device 2 received in the casing 10 has the cell stacks 80*a* and 80*b* in which a plurality of fuel cells 81 are disposed in a row. The two cell stacks 80*a* and 80*b* are disposed so that the respective cells are parallel to each other, and are fixed onto the manifold 72. The manifold 72 is a fuel gas case that receives the fuel gas in the internal space thereof. At the end portion of the cell stacks 80*a* and 80*b* as viewed in the disposition direction of the cells, current removal members 91*a* extending forward are provided.

The reformer 71 is disposed above the cell stacks 80*a* and 80*b*. A supply tube 71*a* for gas to be reformed and a water supply tube 71*b* are connected to the rear end thereof. A fuel gas feeder tube 71*c* extends toward the manifold 72 from the reformer 71 adjacent to the rear end thereof, and is connected to the upper face of the manifold 72. Temperature sensors 71d are inserted from the front end of the reformer 71. A detailed description about the reformer 71 will be given later.

FIG. 14A is a plan view of a cell stack 80a in the pair of cell stacks shown in FIG. 10, FIG. 14B is a right side view thereof, FIG. 14C is a front side view thereof, and FIG. 14D is an enlarged view of a portion A in FIG. 14B.

The cell stack 80a is constituted of a plurality of fuel cells 81 disposed in a row. Power collection members 97 are disposed between two neighboring fuel cells 81 and electrically connect these fuel cells 81. Further, at both ends of the cell stack 80a, current removal members 90a and 90b are provided.

Figure 15:
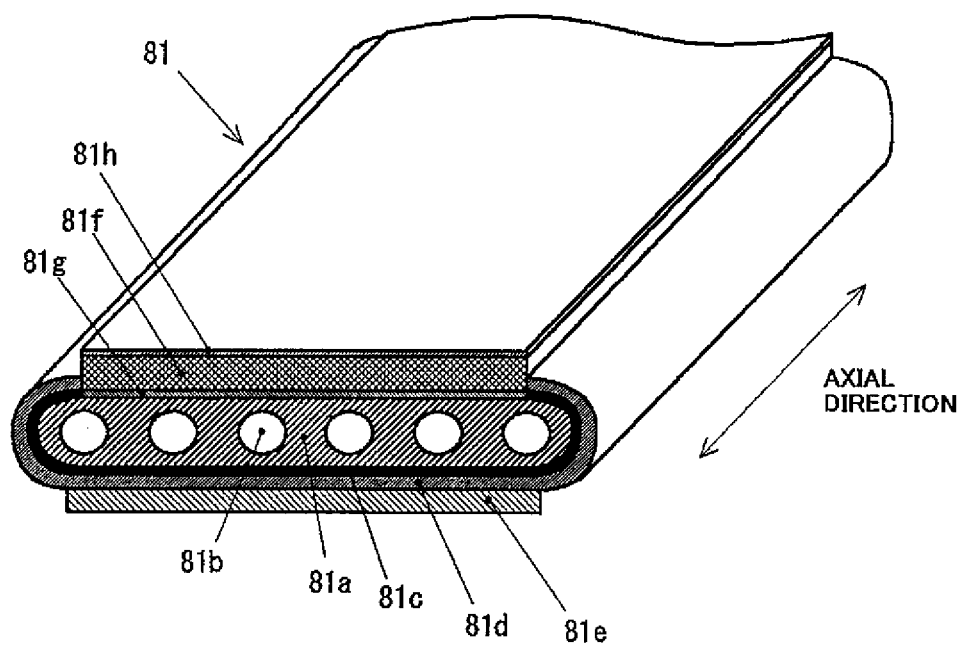
FIG. 15 is a partial perspective view of a portion of the fuel cell including a cross section thereof.

Now, referring to FIGS. 15 to 18, the respective component elements shown in FIG. 14 will be described. FIG. 15 is a partial perspective view of a fuel cell 81 including a cross section thereof. The fuel cell 81 has a flat columnar shape as a whole. A plurality of fuel gas paths 81b is formed inside a conductive support 81a having gas-transmissive properties therethrough along the axial direction thereof. On one flat surface in the periphery of the conductive support 81a, a fuel electrode 81c, a solid electrolyte 81d and an oxygen electrode 81e are laminated in order. On the other flat surface opposite the oxygen electrode 81e, an interconnector 81f is formed via a junction layer 81g and a P-type semiconductor layer 81h is formed thereon for reducing contact resistance.

In the fuel cell 81 as described above, hydrogen is supplied to the fuel electrode 81c by the fuel gas (hydrogen-rich gas) flowing within the fuel gas paths 81b; while oxygen is supplied to the oxygen electrode 81e by the oxygen-containing gas (for example, air) supplied to the surrounding area of the fuel cell 81. This arrangement causes the following reactions to occur at the oxygen electrode 81e and the fuel electrode 81c, thereby generating power. The power generating reaction is performed at a temperature of 600 to 1000° C.

Oxygen electrode: 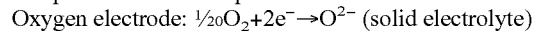
Fuel electrode: 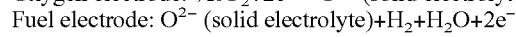

The material for the oxygen electrode 81e is required to be stable in an oxidation atmosphere and to be porous so that the gaseous oxygen can reach the boundary between the solid electrolyte 81d and the same. The solid electrolyte 81d carries oxygen ions $O^{2-}$ from the oxygen electrode 81e to the fuel electrode 81c. The material for the solid electrolyte 81d is an oxygen ion conductive oxide, and is required to be stable in an oxidation/reduction atmosphere and to be dense to physically separate the fuel gas from the oxygen-containing gas. The material for the fuel electrode 81c is required to be stable in a reduction atmosphere and to have an affinity to hydrogen. The interconnector 81f is formed for connecting the fuel cells 81 to each other in series, and is required to be dense to physically separate the fuel gas from the oxygen-containing gas.

For example, the oxygen electrode 81e is formed of a lanthanum manganate-based perovskite-type complex oxide which has high conductivity to both electrons and ions. The solid electrolyte 81d is formed of $ZrO_2$ (YSZ) including $Y_2O_3$ having high ionic conductivity. The fuel electrode 81c is formed of a mixture of Ni having high conductivity to electron and $ZrO_2$ (YSZ) including $Y_2O_3$. The interconnector 81f is formed of $LaCrO_3$ including a solid-soluted alkaline earth oxide having high conductivity to electrons. The respective materials preferably have a coefficient of thermal expansion close to each other.

Referring again to FIG. 14, the current, generated by the above power generating reaction, flows through the respective fuel cells 81, which are connected in series via the power collection members 97, and is output to an external power conversion device via current removal members 90a and 90b each provided in both ends of the cell stack 80a.

FIG. 16A is an external perspective view of one current removal member 90a; and FIG. 16B is an external perspective view of the other current removal member 90b. Now, referring to FIG. 14 and FIG. 16, the structure of the current removal members 90a and 90b located at the cell stack ends will be described.

The current removal member 90a is disposed at the end of the fuel cell 81 located at the front-end of the cell stack 80a via end power collection members (may be identical to the intermediate power collection members 97). In order to prevent local concentration of the current, a ceramic material or an adhesive having conductivity may be provided between the current removal member 90a and the end power collection members. The current removal member 90a is formed of an inexpensive heat-resistant alloy. The current removal member 90a includes a flat plate portion 92a and a pair of side plate portions 94a that are bent at both edges of the flat plate portion 92a and that extends forward generally perpendicular thereto. This configuration is preferred for increasing the rigidity of the current removal member 90a and for stably disposing the same vertically. The current removal member 90a comes into contact with the end power collection members with the whole face of the flat plate portion 92a having a wide area. Further, since the current removal member 90a can be formed in a satisfactory thickness, the resistance and the power loss can be reduced accordingly.

Further, a strip-like current removal piece 91a extends forward perpendicular to the flat plate portion 92a from the central area in a lower portion of the flat plate portion 92a. The current removal piece 91a has a step-like bent portion 93a in an intermediate portion thereof for fitting with the configuration of the manifold. This will be described later with reference to FIG. 20. The front end of the current removal piece 91a is connected to the outside via an appropriate electric wire. Thus, the current removal piece 91a is a rigid part in the current removal member 90a and is formed integrally therewith. Therefore, there is no possibility of disengagement of the current removal member 90a due to vibration and/or shock. Lower end portions of the current removal member 90a are bent to form foot portions 95a. This arrangement permits the current removal member 90a to be disposed vertically.

A current removal member 90b is disposed likewise at the rear side of the cell stack 80a. The current removal member 90b has generally the same configuration as that of the current removal member 90a. However, the length of the current removal piece 91b and the shape of a bent portion 93b located in an intermediate portion thereof are different from those of the current removal member 90a as shown in FIG. 14D. This is also for fitting the current removal piece 91b with the shape of the manifold. This will be described later with reference to FIG. 20.

The power collection members 97, which are disposed between the fuel cells 81, have elasticity to expand/contract in the cell array direction. Therefore, when the cell stack 80a is installed, the power collection members 97 receive a compression force from both ends thereof and are elastically deformed. As a result, electrical connection with the fuel cell 81 is reliably ensured. Therefore, the current removal members 90a and 90b, which are disposed at both ends of the cell stack 80a, function as holder plates that hold the cell stack 80a in a compressed state. Consequently, the pair of current removal members 90a and 90b presses the cell stack 80a from both sides in the cell array direction, and thus, the cell stack is fixed therebetween. A detailed description of the fixing method will be given later.

Figure 17A:
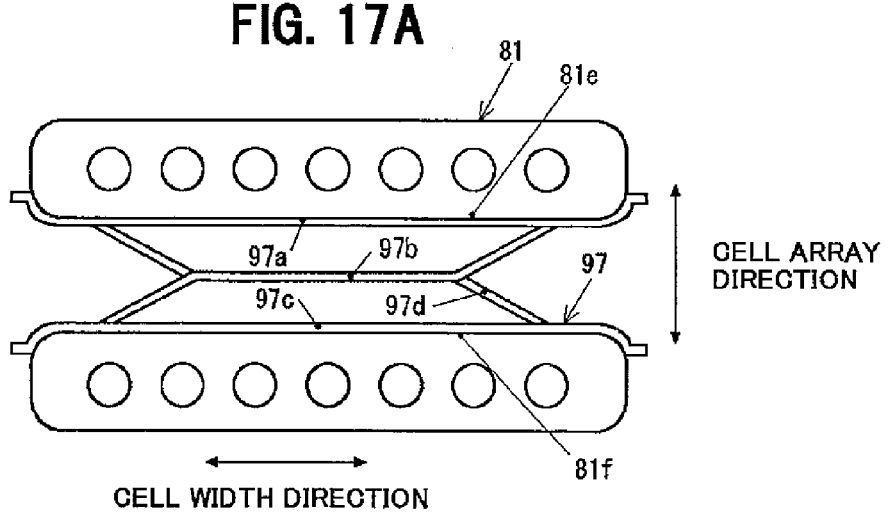
FIG. 17A is an enlarged plan view of a power collection member.
Figure 17B:
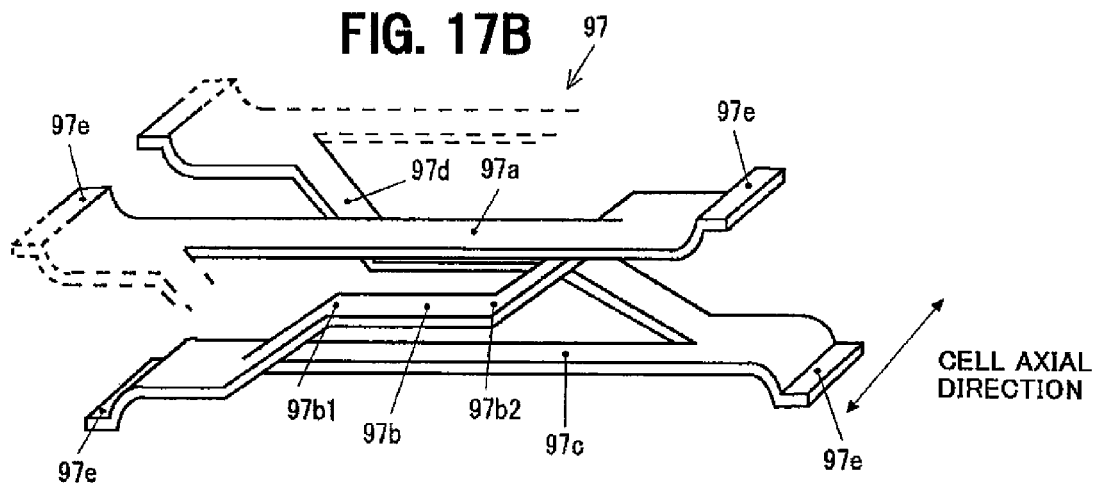
FIG. 17B is a partial perspective view of the power collection member.

FIG. 17A is an enlarged plan view showing arbitrary two neighboring fuel cells 81 and a power collection member 97 disposed therebetween in the cell stack 80a shown in FIG. 14. FIG. 17B is a partial perspective view of the power collection member 97 shown in FIG. 17A. The following descriptions will be given while referring to the two fuel cells 81 as a first cell and a second cell respectively. The power collection member 97 is constructed including the following basic elements, i.e., a first conductor piece 97a that abuts a flat face of the first cell, a second conductor piece 97b that extends being inclined from one end portion of the first cell toward the other end portion of the second cell, a third conductor piece 97c that abuts on a flat face of the second cell, and a fourth conductor piece 97d that extends being inclined from one end portion of the second cell toward the other end portion of the first cell. The first to fourth conductor pieces 97a to 97d are connected to each other in this order at the respective end portions. Further, the conductor pieces 97a to 97d are repeatedly connected to each other in this order thereby forming a series of power collection members 97 that extends in the axial direction of the cell is formed. The first conductor piece 97a and third conductor piece 97c as a flat portion of the power collection member 97 abut on the flat face of the fuel cell 81, thereby establishing an electrical connection with the oxygen electrode 81e or the interconnector 81f. Being formed with two bent portions 97b1 and 97b2, the inclined second conductor piece 97b has a further flexible structure (this is the same in the fourth conductor piece 97d). The power collection member 97 with the above-describe configuration has satisfactory flexibility. Accordingly, the power collection member 97 has satisfactory flexibility to follow the deformations in the cell array direction and cell axial direction, and is superior in airflow.

Further, both ends of the power collection member 97 shown in FIG. 17 are bent along the shape of both ends of the fuel cell 81 in the width direction thereof to support the fuel cell 81 by grasping the same from both sides thereof. This arrangement strongly joins the power collection member 97 and the fuel cell 81 to each other, and thus the power collection member 97 is prevented from peeling off from the fuel cell 81 and the electrical connection therebetween is stably ensured. Further, the power collection member 97 is formed with ribs 97e at the front end in the width direction thereof protruding outwardly from the fuel cell 81. The ribs 97e are used as shown in FIG. 18.

Figure 18B:
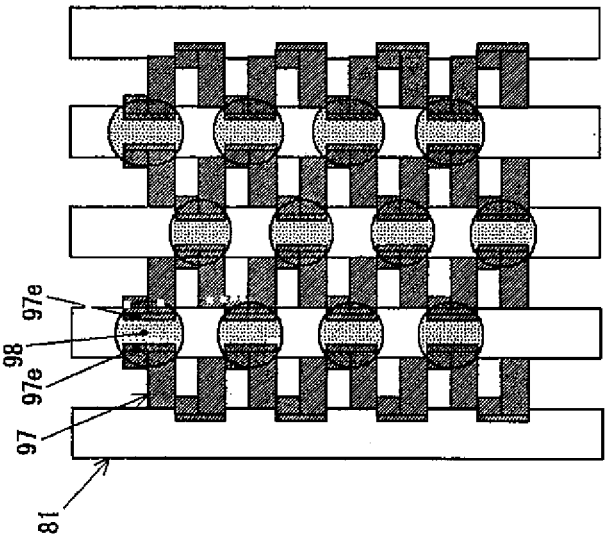
FIG. 18B is a partial side view thereof.
Figure 18A:
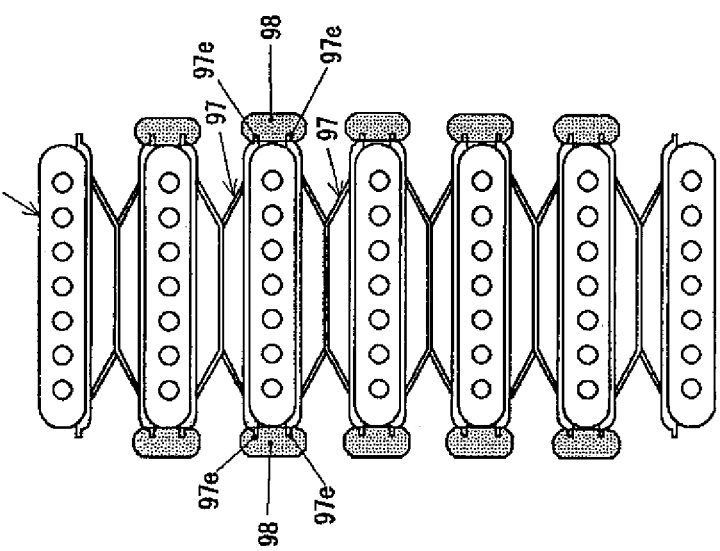
FIG. 18A is a partially enlarged plan view schematically showing the cell stack.

FIG. 18A is a partially enlarged plan view schematically showing the cell stack 80a shown in FIG. 14A; and FIG. 18B is a partial side view thereof. As shown in the plan view of FIG. 18A, at both ends in the width direction of the fuel cell 81, ribs 97e of the two neighboring power collection members 97 are positioned adjacent to each other and are facing each other. These pair of ribs 97e are connected to each other and fixed with a sealing material 98 such as glass. This arrangement connects the fuel cell 81 and the power collection member 97 to each other further strongly. Each pair of the ribs 97e is preferably fixed intermittently with the sealing material 98 as shown in FIG. 18B. If the sealing material 98 is applied continuously entirely in the axial direction, the rigidity of the power collection member 97 becomes too high, and the flexibility thereof is lost.

Figure 20A:
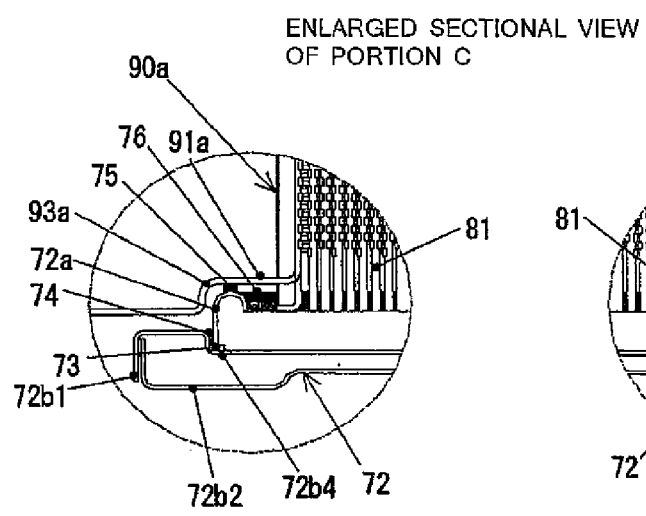
FIG. 20A is an enlarged sectional view of a portion C in FIG. 19B.
Figure 20B:
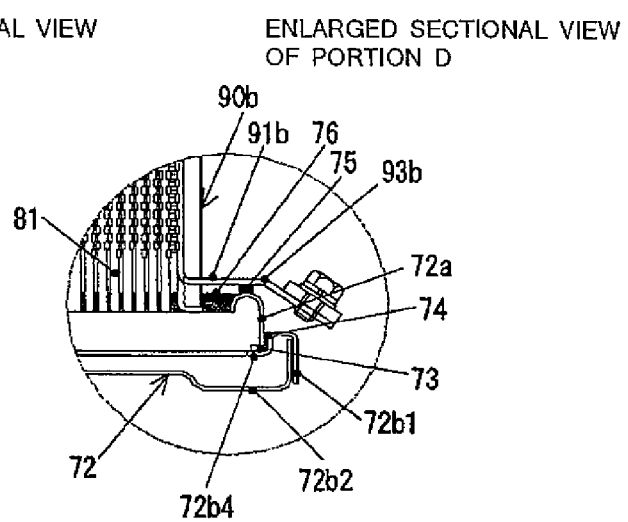
FIG. 20B is an enlarged sectional view of a portion D in FIG. 19B.
Figure 20C:
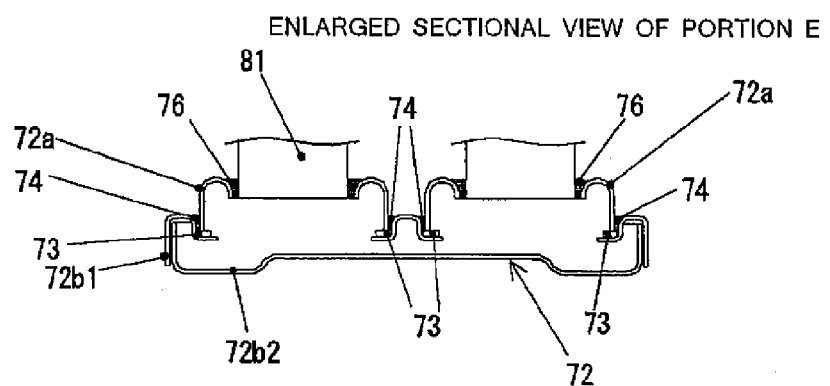
FIG. 20C is an enlarged sectional view of a portion E in FIG. 19C.

FIGS. 19 and 20 show the pair of cell stacks 80a and 80b shown in FIG. 10 and a manifold 72 supporting and fixing the cell stacks 80a and 80b. The cell stack 80b has a structure identical to that of the cell stack 80a, which has been described with reference to FIGS. 14 to 18. FIG. 19A is a plan view of the pair of cell stacks 80a and 80b and the manifold 72, FIG. 19B is a right side view thereof, FIG. 19C is a B-cross sectional view of FIG. 19B; and FIG. 19D is a rear side view thereof. Also, FIG. 20A is an enlarged sectional view of a portion C in FIG. 19B, FIG. 20B is an enlarged sectional view of a portion D in FIG. 19B, and FIG. 20C is an enlarged sectional view of a portion E in FIG. 190.

The pair of cell stacks 80a and 80b are supported by the upper face of one manifold 72 and fixed thereto as shown in FIG. 19. The manifold 72 is constituted of a set of two parts; i.e., an upper case 72a and lower case 72b. The upper case 72a includes two parts to support and fix the cell stacks 80a and 80b respectively. The lower case 72b is constituted of one part.

FIG. 21A is a plan view of the lower case 72b, FIG. 21B is a right side view thereof; FIG. 21C is a H-cross sectional view of FIG. 21A, and FIG. 21D is an I-cross sectional view of FIG. 21A.

FIG. 22A is a plan view of the upper case 72a, FIG. 22B is a right side view thereof, FIG. 22C is a G-cross sectional view of FIG. 22A, and FIG. 22D is a F-cross sectional view of FIG. 22A.

The constitution of the manifold 72 will be described below with reference to FIGS. 19 to 22.

As shown in FIG. 21, the lower case 72b is constituted of a plate-like bottom member 72b2 and a cap member 72b1 covering an upper end opening of the bottom member 72b2 being joined to each other. In the upper face of the cap member 72b1 of the lower case 72b, a pair of openings 72b3 is formed. On the inner periphery of the respective openings 72b3, a supporting portion 72b4 is formed protruding inwardly within the opening. On the supporting portions 72b4 in the openings 72b3, the upper cases 72a shown in FIG. 22 are placed respectively. Further, in the upper face of the cap member 72b1, a gas introduction hole 72c is formed for connecting the fuel gas feeder tube 71c from the reformer 71 shown in FIG. 10. As shown in the enlarged view of FIG. 20C, the inner space of the manifold 72 is formed as a chamber by the upper case 72a and the lower case 72b joined to each other so as to receive the fuel gas flowing therein from the gas introduction hole 72c.

As shown in FIG. 22, the upper case 72a is constituted of a circular portion 72a1 enclosing the periphery of an opening 72a3. Within the opening 72a3, the lower end of the respective fuel cells in the cell stack is disposed. The circular portion 72a1 is formed with a turn-up portion 72a4 where is turned inwardly into a U-like shape in cross section.

The configuration formed with the turn-up portion 72a4 preferably reduces the stress, which is generated due to the differences in the thermal expansion coefficients among the manifold 72, the fuel cells disposed in the opening 72a3 and the sealing material fixing the fuel cells. As a result, the joint strength among the manifold 72, the fuel cells and the sealing material is increased and a stable fixing state is ensured. The lower end 72a2 of the circular portion 72a1 is placed in an electrically insulated state on the supporting portion 72b4 of the opening 72b3 in the lower case 72b.

Referring to FIGS. 20A and 20B, an insulating ceramic plate 73 is placed on the supporting portion 72b4 of the lower case, and the lower end of the upper case 72a is placed thereon. The ceramic plate 73 is, for example, a mica plate or forsterite. Further, the upper case and the lower case are joined to each other by filling an insulating sealing material 74 such as glass therebetween. The ceramic plate 73 and the sealing material 74 ensure the insulation between the upper case and the lower case. The insulating means is not limited to the ceramic plate, but may be an insulating thin film or plate. Ordinarily, the manifold 72 is preferably formed of an inexpensive heat-resistant alloy. By ensuring the electrical insulation between the upper case and the lower case as described above, even when the upper case 72a comes into electrical contact with fuel cell 81, the lower case can be insulated. Thus, the current is prevented from leaking to the other component elements in the fuel cell module.

Further, referring to FIG. 20A and FIG. 20B, one end of the respective fuel cells 81 in the cell stack and one end of the current removal members 90a and 90b are supported and fixed being embedded in the insulating sealing material 76 such as glass in the opening of the upper case 72a. As a result, the cell stack is fixed being pressed by the current removal members 90a and 90b at both ends thereof. The fuel gas path in the supported and fixed fuel cells 81 is communicated with the internal space within the manifold 72. With this arrangement, the fuel gas received within the manifold 72 is supplied to the fuel gas paths of the fuel cells 81.

Since the cell stack is fixed to the manifold 72, even when a part of fuel cells 81 gets damaged, the cell stack can be taken out along with the manifold 72 and replaced. In this case, compared to the case where the fuel cells are directly fixed to the casing, maintenance service can be easily carried out.

Furthermore, referring to FIG. 20A, the current removal piece 91a extending outward from the current removal member 90a is fixed to the manifold 72 by the insulating sealing material 75 such as glass at a part of the bottom thereof. This arrangement ensures the electrical insulation between the current removal piece 91a and the manifold 72, and the stability of the current removal piece 91a against vibration and/or shock is increased. Also, the current removal piece 91a has the step-like bent portion 93a shaped along the outer shape of the manifold 72. This arrangement also prevents the current removal piece 91a from coming into contact with the manifold 72.

Further, referring to FIG. 20E, the current removal piece 91b extending outward from the current removal member 90b is also fixed to the manifold 72 by the insulating sealing material 75 at a part of the bottom thereof. This arrangement ensures electrical insulation between the current removal piece 91b and the manifold 72 and increases the stability against vibration and/or shock. The bent portion 93b on the current removal piece 91b is also formed along the outer shape of the manifold 72 to prevent contact with the manifold 72.

Referring to FIG. 19A again, the current removal members 90b and 90b at the rear end of the cell stacks 80a and 80b are electrically connected to each other by a conductive coupling member 99a. Each of the current removal members 90b and the coupling member 99a are connected to each other and fixed by a fixing member 99b respectively. This arrangement permits all fuel cells 81 included in the cell stack 80a and 80b to be connected in series to each other. Therefore, the current can be taken out to the outside by the pair of current removal members 90a and 90a at the front end thereof.

Now, referring to FIG. 23, the reformer 71 will be described.

Figure 23:
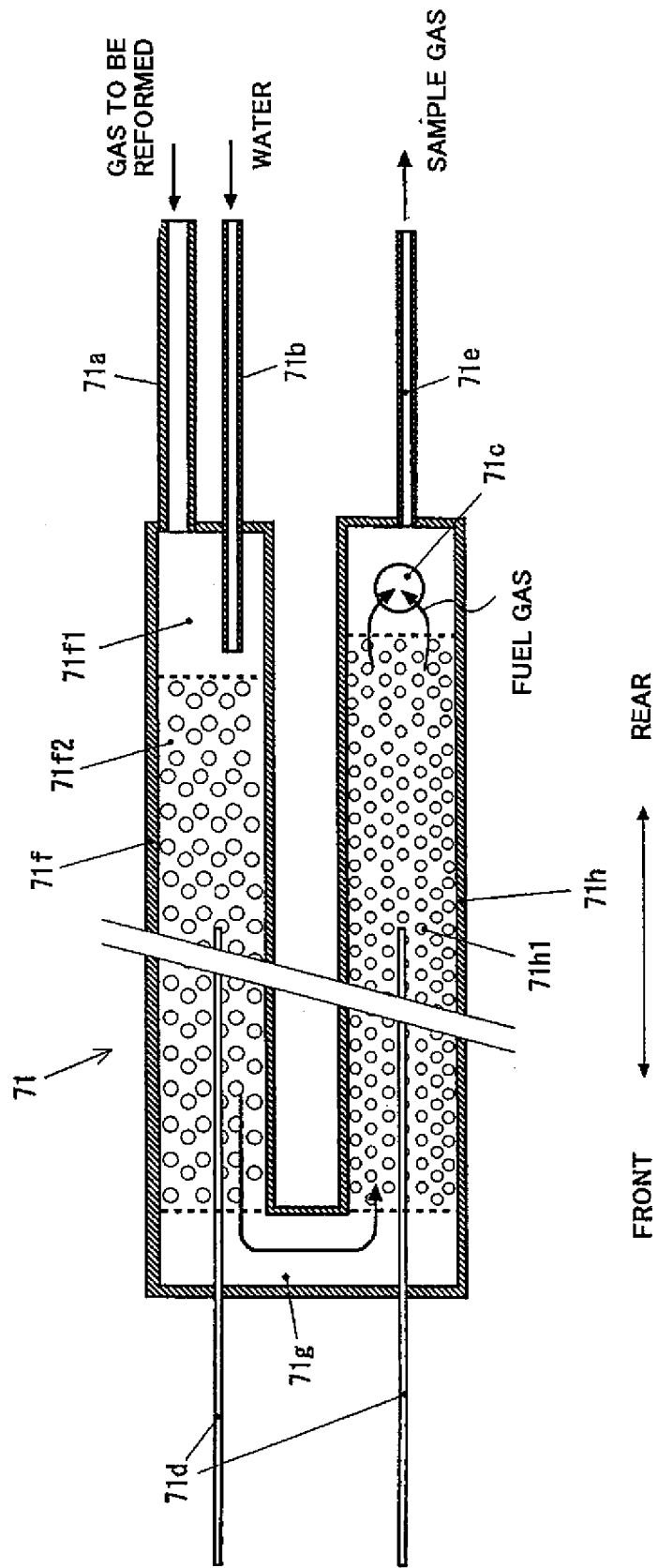
FIG. 23 is a lateral sectional view schematically showing the reformer in FIG. 10.
Figure 26:
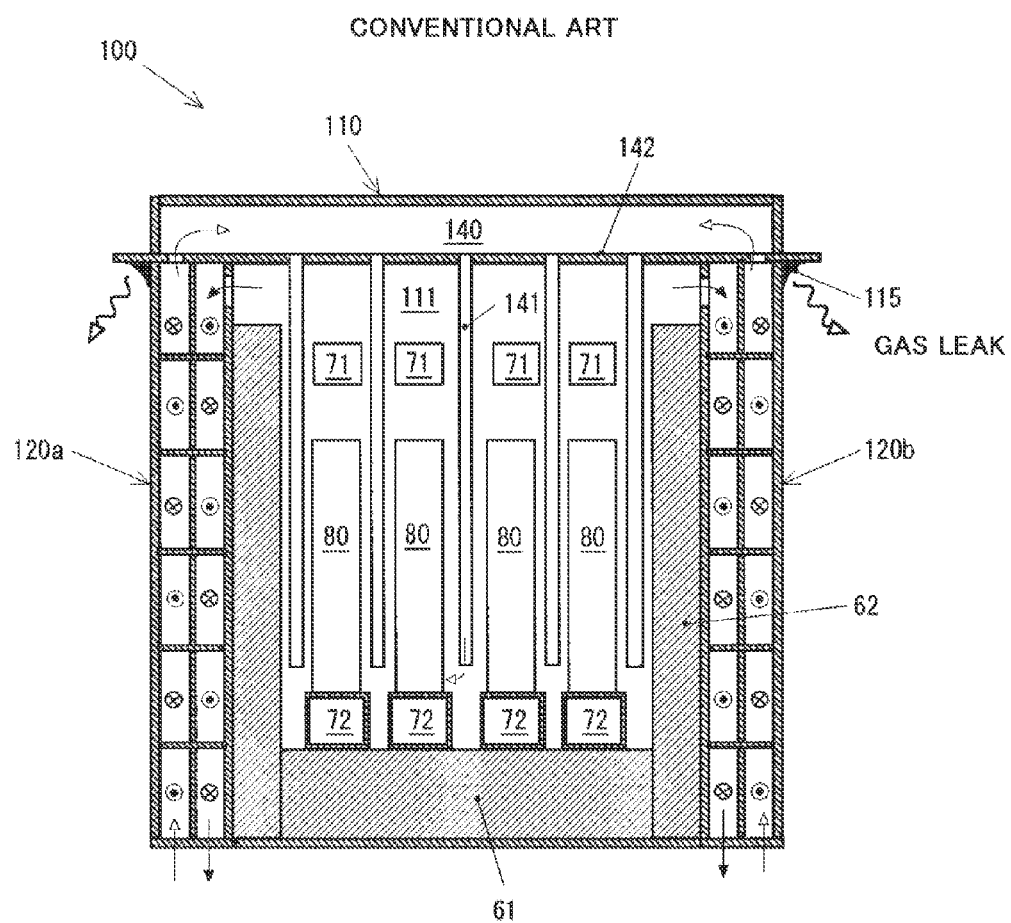
FIG. 26 is a schematic sectional view showing a typical example of a conventional fuel cell module.

FIG. 23 is a lateral sectional view schematically showing the reformer 71 shown in FIG. 10. The reformer 71 is composed of a first case 71f and a second case 71h disposed in parallel to each other. Each of the cases has a generally rectangular shape extending in a front-rear direction. A hollow connecting portion 71g connects the front ends of the respective cases to each other thereby communicating the internal spaces thereof with each other. Therefore, the reformer 71 has a generally U-like shape as a whole.

Referring again to FIG. 10, the first case 71f is located above the cell stack 80a while the second case 71h is located above the cell stack 80b. Therefore, waste heat from the cell stack can be utilized effectively for maintaining the temperature of the reformer 71. Also, as shown in FIG. 10, the reaction gas introduction member 40 extending downwardly vertically from the upper wall of the casing 10 is disposed so as to extend in a space between the first case 71f and the second case 72h within the power-generating chamber 17. The gas supply tube and sensor, which are connected to or provided in the reformer 71, extend to the outside from the inside of the casing 10. The casing 10 is appropriately formed with a hole or holes for permitting the gas supply tube and sensor to be disposed therein.

Referring to FIG. 23, the supply tube 71a for gas to be reformed and the water supply tube 71b are connected to the first case 71f at the rear end thereof, thereby supplying gas to be reformed and water to the first case 71f respectively. The gas to be reformed may be a hydrocarbon gas such as city gas. The water is refined deionized water. The gas to be reformed enters the first case 71f, and then flows from a vaporizing chamber 71f1 to a mixing chamber 71f2. On the other hand, the water supply tube 71b extends deeply in the vaporizing chamber 71f1 of the first case 71f. Water flows out from the front end and is vaporized within the vaporizing chamber 71f1 and flows to the mixing chamber 71f2. An air-permeable wall separates the vaporizing chamber 71f1 and the mixing chamber 71f2 from each other. The gas to be reformed and the vapor are mixed in the mixing chamber 71f2 filled with zirconia balls. The mixed gas enters the second case 71h through the connecting portion 71g. The second case 71h is filled with a reforming catalyst 71h1. A vapor-reforming reaction is carried out in the second case 71h to reform the hydrocarbon gas into hydrogen, thereby obtaining the hydrogen-rich fuel gas. The fuel gas is fed out to the fuel gas feeder tube 71c connected to the bottom face vicinity of the rear end of the second case 71h. Also, a part the fuel gas is taken out for analysis from a sample tube 71e connected to the rear end of the second case 71h. The data is used for controlling the power generating conditions.

In order to detect the temperature within the first case 71f and the second case 71h, a pair of sensors 71d is inserted into the reformer 71 through the front end thereof and fixed thereto.

FIG. 24A is an external perspective view of an embodiment of the reformer 71 as viewed diagonally from the rear side thereof, FIG. 24B is an exploded view of the reformer 71 in FIG. 24A, FIG. 24C is a lateral sectional view of a vaporizing and mixing unit 71j, and FIG. 24D is a lateral sectional view of a reforming unit 71k.

The configuration of the reformer 71 in FIG. 24 is a U-like shape as a whole identical to that of the reformer shown in FIG. 23. In the reformer 71 in FIG. 24, component elements each received in the first case 72f and the second case 72h are integrated in a unit for facilitating the replacement thereof. For example, when the reforming catalyst is degraded or the water supply tube 71b is clogged due to calcium separated out from the water, replacement thereof is required.

As shown in FIG. 24, the vaporizing and mixing unit 71j is mounted in a first case 71f and the reforming unit 71k is mounted in a second case 71h.

As shown in FIGS. 24B and 24C, the vaporizing and mixing unit 71j is entirely covered with a mesh or punched case 71f3, and the rear wall thereof functions as a flange 71i3. The mesh or the like 71f3 has air permeability and rigidity for maintaining a constant configuration thereof. The supply tube 71a for gas to be reformed and the water supply tube 71b are connected to the rear wall. The inside of the vaporizing and mixing unit 71j is separated into the vaporizing chamber 71f1 and the mixing chamber 71f2 by an air permeable wall. The water supply tube 71b extends into the vaporizing chamber 71f1. The mixing chamber 71f2 is filled with zirconia balls. On the other hand, a flange 71i1 is formed at the rear side of the first case 71f. When mounting the vaporizing and mixing unit 71j, the same is inserted into a gasket 71i2, and the flange 71i1, the gasket 71i2 and the flange 71i3 are overlapped with one another and fixed to seal the same.

Likewise, the reforming unit 71k is entirely covered with a mesh or punched case 71h3, and the rear wall thereof functions as a fixing flange. A sample tube 71e is connected to the rear wall. The inside of the unit is filled with the reforming catalyst 71h1. The reforming unit 71k is mounted in the same manner as the vaporizing and mixing unit 71j.

FIGS. 25A and 25B are exploded views of the reformer 71 as viewed from the front side thereof, each showing further another embodiment. The reformer 71 in FIG. 25 has substantially the same U-like shape as a whole as that of the reformer shown in FIGS. 23 and 24. The point different from the reformer shown in FIG. 24 is that, in the reformer 71 shown in FIG. 25, the internal units can be replaced from the front end thereof.

In the reformer 71 shown in FIG. 25A, an integrated unit 71m having a U-like shape is mounted in the first case 71f and the second case 71h. The unit 71m is covered with a mesh or punched case, and one front wall thereof functions as a fixing flange 71i3. Temperature sensors 71d are provided through the front wall. Component elements shown in FIGS. 24C and 24D are likewise disposed within the unit 71m. The mounting and fixing method is the same as the embodiment shown in FIG. 24 excepting the point that the component elements are replaced from the front side of the reformer 71.

In the reformer 71 in FIG. 25B, square tube members are used as a first case 71f and a second case 71h, and the front ends thereof are connected with a coupling tube 71g, thus forming a generally U-like shape as a whole. A vaporizing and mixing unit 71p is mounted from the front end of the first case 71f while a reforming unit 71q is mounted from the front end of the second case 71h. Front walls of the respective units 71p and 71q function as a fixing flange respectively. The units 71p and 71q are the same as the component elements shown in FIGS. 24C and 24D.

What is claimed is:
1. A fuel cell module, comprising:
a power-generating chamber that receives fuel cells; and a casing having a generally rectangular shape enclosing the power-generating chamber,
wherein the casing comprises right and left side walls and an upper wall, wherein the right and left side walls and the upper wall are formed with an outer shell member and an inner shell member disposed side by side with a predetermined distance therebetween, wherein the casing is provided with a reaction gas circulation space for circulating the reaction gas provided in between the outer shell member and the inner shell member;
an inner wall for waste gas and the inner shell member disposed side by side with a predetermined distance therebetween at the power-generating chamber side of the inner shell member forming the right and left side walls;
a waste gas circulation space provided in between the inner shell member and the inner wall for waste gas and communicated with the power-generating chamber at the upper portion of the waste gas circulation space;
a waste gas outlet storage chamber communicated with each of the waste gas circulation space immediately under the power-generating chamber;
a reaction gas inlet storage chamber communicated with each of the reaction gas circulation space immediately under the waste gas outlet storage chamber;
a reaction gas introduction member for introducing the reaction gas into the power-generating chamber vertically extending downward from the inner shell member forming the upper wall into the power-generating chamber; and
a reaction gas introduction space communicated with the reaction gas circulation spaces in the reaction gas introduction member.

2. The fuel cell module according to claim 1, wherein the reaction gas introduction member is constituted of a pair of plates disposed parallel to each other with a predetermined distance therebetween and a reaction gas introduction opening, wherein the reaction gas opening is formed at a lower portion of the reaction gas introduction member.

3. The fuel cell module according to claim 2, wherein the reaction gas introduction member is disposed at both sides respectively right and left symmetrically with respect to the center of the inner shell member forming the upper wall.

4. The fuel cell module according to claim 2, wherein one reaction gas introduction member is provided in a central position of the inner shell member forming the upper wall.

5. The fuel cell module according to claim 1, wherein a meandering flow path is formed within the reaction gas circulation space by providing a plurality of partial partition plates disposed laterally alternately between the outer shell member and the inner shell member forming the right and left side walls with a predetermined distance therebetween in a vertical direction.

6. The fuel cell module according to claim 1, wherein a meandering flow path is formed within the waste gas circulation space by providing a plurality of partial partition plates disposed laterally alternately between the inner shell member forming the right and left side walls and the inner wall for waste gas with a predetermined distance therebetween in a vertical direction.

7. The fuel cell module according to claim 1, wherein one of front and rear side walls of the casing is sealed and the other is arranged to be opened and closed, and the side wall arranged to be opened and closed is formed with a piping aperture.

8. The fuel cell module according to claim 1, wherein the front and rear side walls of the casing are arranged to be opened and closed, and the side walls arranged to be opened and closed are formed with a piping aperture.

9. The fuel cell module according to claim 1, wherein one or a plurality of through holes penetrating at least one of the right and left side walls while sealing the reaction gas circulation space and the waste gas circulation space is provided.

10. The fuel cell module according to claim 1, further comprising a cell stack of a plurality of the fuel cells arrayed in a row, and a manifold fixing one end of the fuel cells, wherein the manifold is composed of an upper case and a lower case joined to each other, the upper case includes one or a plurality of openings in the upper face thereof and a circular portion formed with a turn-up portion turned inwardly enclosing the periphery of the opening, and the fuel cells are disposed vertically within the opening of the upper case with the one end thereof sealed by a sealing material.

11. The fuel cell module according to claim 1, further comprising a cell stack of a plurality of the fuel cells arrayed in a row via power collection members, rigid current removal members each disposed at both ends of the cell stack, and strip-like current removal pieces extending outwardly as a part of the current removal members.

12. The fuel cell module according to claim 11, further comprising a manifold fixing one end of the respective fuel cells, wherein one end of the current removal members is joined and fixed in an insulated state to the manifold.

13. The fuel cell module according to claim 1, further comprising a cell stack of a plurality of the fuel cells arrayed in a row, wherein the cell stacks are arranged in two rows parallel to each other within the power-generating chamber.

* * * * *